US007843610B2

(12) United States Patent
Hoshi

(10) Patent No.: US 7,843,610 B2
(45) Date of Patent: Nov. 30, 2010

(54) DOCUMENT READING APPARATUS AND AN IMAGE FORMATION APPARATUS

(75) Inventor: Kazunori Hoshi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1319 days.

(21) Appl. No.: 11/357,078

(22) Filed: Feb. 21, 2006

(65) Prior Publication Data
US 2006/0203306 A1      Sep. 14, 2006

(30) Foreign Application Priority Data
Feb. 28, 2005   (JP) .............................. 2005-052887

(51) Int. Cl.
*H04N 1/04* (2006.01)
(52) U.S. Cl. ................. 358/474; 358/1.2; 358/1.9; 358/509; 358/475; 399/43; 399/404; 382/274; 382/275
(58) Field of Classification Search ............ 358/474, 358/1.15, 404, 1.14, 509, 475, 520, 409, 358/437, 446, 468, 443, 1.2, 1.9; 399/43, 399/12, 82, 67, 70, 301; 382/274, 275
See application file for complete search history.

(56) References Cited

U.S. PATENT DOCUMENTS

| 4,899,192 | A | | 2/1990 | Fujita | |
|---|---|---|---|---|---|
| 5,423,512 | A | * | 6/1995 | Ushio et al. | 250/205 |
| 6,128,104 | A | * | 10/2000 | Okabe et al. | 358/442 |
| 6,359,701 | B1 | * | 3/2002 | Yamada et al. | 358/1.2 |
| 6,418,281 | B1 | * | 7/2002 | Ohki | 399/49 |
| 6,822,764 | B1 | * | 11/2004 | Okabe et al. | 358/442 |
| 7,460,808 | B2 | * | 12/2008 | Okada | 399/88 |

(Continued)

FOREIGN PATENT DOCUMENTS

JP            62061040              3/1987

(Continued)

OTHER PUBLICATIONS

Office Action for U.S. Appl. No. 11/357,986 dated Oct. 27, 2009.

(Continued)

*Primary Examiner*—Negussie Worku
(74) *Attorney, Agent, or Firm*—Harness, Dickey & Pierce, P.L.C.

(57) ABSTRACT

A document reading apparatus is disclosed. The document reading apparatus includes a scanner; an energy-saving power supply unit; an energy-saving control unit; a clock IC; an output compensation unit for updating digital conversion parameters including image signal amplification gain such that image data of a reference white board read by a CCD of the scanner are made into a proper value; and
an output compensation controlling unit. The output compensation controlling unit reads time data when an operation mode is shifted from pause mode to waiting mode, stores the digital conversion parameters updated by the output compensation unit in a non-volatile memory, updates operation time with the present time if the elapsed time from a previous operation time stored in the non-volatile memory is equal to or greater than a setup value, and uses the digital conversion parameters stored in the non-volatile memory as they are, if the elapsed time from the previous operation time stored in the non-volatile memory is less than the setup value.

20 Claims, 20 Drawing Sheets

U.S. PATENT DOCUMENTS

| | | | |
|---|---|---|---|
| 7,715,066 B2 * | 5/2010 | Michiie | 358/474 |
| 2001/0040704 A1 | 11/2001 | Kanno | |
| 2002/0048470 A1 * | 4/2002 | Kanno | 399/205 |
| 2002/0054330 A1 * | 5/2002 | Jinbo et al. | 358/1.15 |
| 2002/0146256 A1 * | 10/2002 | Sekiguchi et al. | 399/82 |
| 2002/0178389 A1 * | 11/2002 | Satoh | 713/310 |
| 2003/0107784 A1 | 6/2003 | Togashi | |
| 2004/0088066 A1 * | 5/2004 | Yamazaki et al. | 700/95 |
| 2004/0146313 A1 * | 7/2004 | Uchizono et al. | 399/75 |
| 2005/0271411 A1 * | 12/2005 | Shibaki et al. | 399/82 |
| 2006/0028696 A1 * | 2/2006 | Michiie et al. | 358/474 |
| 2006/0077418 A1 * | 4/2006 | Nakajima et al. | 358/1.14 |
| 2006/0100724 A1 * | 5/2006 | Miura et al. | 700/82 |
| 2006/0174141 A1 | 8/2006 | Chang | |
| 2006/0208157 A1 * | 9/2006 | Michiie | 250/208.1 |
| 2007/0201049 A1 * | 8/2007 | Semma et al. | 358/1.1 |
| 2008/0297837 A1 * | 12/2008 | Soda | 358/1.15 |

FOREIGN PATENT DOCUMENTS

| | | |
|---|---|---|
| JP | 6-189075 | 7/1994 |
| JP | 06-326867 | 11/1994 |
| JP | 10-136203 | 5/1998 |
| JP | 11075025 | 3/1999 |
| JP | 2001018486 | 1/2001 |
| JP | 2001-211417 | 8/2001 |
| JP | 2001-282041 | 10/2001 |
| JP | 2001-285583 | 10/2001 |
| JP | 2004-109639 | 4/2004 |
| JP | 2004-126132 | 4/2004 |
| JP | 2004-147078 | 5/2004 |
| JP | 2004-229110 | 8/2004 |
| JP | 2004-258386 | 9/2004 |
| JP | 2004-282517 | 10/2004 |
| JP | 2004-320333 | 11/2004 |
| JP | 2004-357023 | 12/2004 |
| JP | 2005-031333 | 2/2005 |
| JP | 2005-035739 | 2/2005 |
| JP | 2005-051443 | 2/2005 |

OTHER PUBLICATIONS

Notice of Rejection of Japanese patent application No. 2005-052887 dated Jan. 8, 2010.

Notice of Rejection of Japanese patent application No. 2005-052888 dated Nov. 12, 2009.

* cited by examiner

DOCUMENT READING APPARATUS AND AN IMAGE FORMATION APPARATUS

BACKGROUND OF THE INVENTION

1. Field of the Invention

The present invention generally relates to a document reading apparatus for reading a document by projecting an image light of the document onto an image sensor, and an image formation apparatus therewith; and especially relates to a document reading apparatus that includes an energy-saving power supply unit, and an image formation apparatus therewith. The document reading apparatus of the present invention can be used by a document scanner, a digital copier, and a facsimile apparatus, among other things.

2. Description of the Related Art

[Patent Reference 1] JPA 2004-229110
[Patent Reference 2] JPA 2004-109639
[Patent Reference 3] JPA 2004-320333.

Patent Reference 1 discloses an image signal processing circuit for converting an image signal generated by a CCD into digital image data, wherein image data of a reference white plate read by the CCD are adjusted to a proper value, and output compensation control for updating image signal amplification gain, an offset, a reference voltage of D/A conversion, and the like.

Patent Reference 2 discloses a document reading apparatus wherein a first carriage of a flat bed is driven to a position of a reference white plate, when shifting from a standby state to a power-saving state, and the reference white plate is read and the first carriage is driven to a position Ph for reading the document size, when returning from the power-saving state to the standby state.

Patent Reference 3 discloses a copying machine, wherein an image reading unit acquires the time duration of an energy-saving mode from a printer engine controller when the copying machine returns from the energy-saving mode to the operating mode, if the duration is greater than a predetermined value, parameters are initialized and stored in a non-volatile memory, the parameters influencing digital conversion characteristics of an image signal processing circuit for carrying out digital conversion of an image signal of a solid state image sensor, such as a CCD, into image data, such that proper image data can be acquired, and if the elapsed time from the latest initialization is less than a predetermined value, the parameters are obtained from the non-volatile memory, and the read parameters are set in the image signal processing circuit.

Conventionally, when the power is turned on for a document scanner, homing, AGC (Automatic Gain Control), etc., are performed before document size detection. Homing is to initialize vertical scanning position information by using position information of a reference point sensor provided at a predetermined position in the vertical scanning direction, when the reference point sensor (for example, a home position sensor) detects a carriage for carrying out vertical scanning of a document while the carriage is moved in the vertical scanning direction. Output compensation control such as AGC is carried out by driving the carriage to a position of reading a reference white plate, reading the reference white plate, and updating parameters, such as image signal amplification gain, of an image signal processing circuit that digitally converts an image signal from an image sensor, such as CCD, into image data so that proper image data are obtained. The output compensation control turns on a lamp (luminous source), reads a reflected light level of the white reference board, and adjusts the digital conversion parameters, such as the amplification gain, an offset, and a reference voltage of D/A conversion, when carrying out the digital conversion of the read image signal into the image data, so that proper image data can be obtained. This is a relatively time consuming process.

Image processing systems available in recent years and continuing often include a power supply unit with an energy-saving mode. A part or all of power supplied to a document scanner and a printer is automatically interrupted if the system is not used for a time longer than a predetermined time (waiting time), and supplying the power to the document scanner and the printer is automatically resumed in response to a user operation of the image processing system. Here, if the control of output compensation of the document scanner, such as AGC, is to be carried out whenever supplying the power is resumed, it takes time before document reading by the document scanner can be started. In view of this, according to Patent Reference 3, the printer engine controller measures duration of the energy-saving mode, the image reading unit obtains the duration of the energy-saving mode, and output compensation control such as AGC is carried out if the duration is longer than the predetermined time; the image reading unit obtains compensation data from the memory if the duration is shorter than the predetermined time.

DESCRIPTION OF THE INVENTION

Problem(s) to be Solved by the Invention

As described above, the printer engine controller has to manage the energy-saving mode duration, and communicate the energy-saving mode duration to each unit when returning to the operating mode, which are in addition to the time management for mode changing between operating and energy-saving modes, and monitoring user access. That is, jobs other than energy-saving control are increased. Further, only when the energy-saving mode duration is longer than the predetermined time is the control of output compensation such as AGC performed. That is, when returning to the operating mode frequently takes place after the energy-saving mode duration that is shorter than the predetermined time, and when the operation mode continues for a long time with less frequent switching to the energy-saving mode, the control of output compensation such as AGC is not performed. For this reason, it is possible that the quality of read image data is degraded as a cumulative operating time of the document scanner becomes long.

SUMMARY OF THE INVENTION

The present invention may provide a document reading apparatus and an image formation apparatus that substantially obviate one or more of the problems caused by the limitations and disadvantages of the related art.

First, an embodiment of the present invention mitigates the burden of a controller that performs mode switching between an energy-saving mode and another mode. Second, the time required before starting document image reading is shortened, the time being required to return from the energy-saving mode to an operating mode. Third, users' operability is maintained high. Fourth, quality of digital conversion of an image signal generated by reading the document is maintained high. Fifth, control of output compensation, such as AGC, is performed at an effective timing.

Features of the present invention are set forth in the description that follows, and in part will become apparent from the description and the accompanying drawings, or may be learned by practice of the invention according to the teachings provided in the description. Problem solutions provided by the present invention will be realized and attained by a document reading apparatus and an image formation apparatus particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides a document reading apparatus and an image formation apparatus as follows.

Means for Solving the Problem

The document reading apparatus includes:

a scanner for scanning a document;

a power supply unit for providing operating voltages for document reading (+25 V and +5 V) to the scanner in a waiting mode, and suspending the power supply in a pause mode;

an input unit for providing operation directions to the scanner;

an energy-saving control unit for switching the power supply unit to the pause mode if there are no operation directions being issued and the waiting mode has lasted a predetermined duration, and for switching the power supply unit to the waiting mode if there are operation directions issued during the pause mode; and a clock unit for counting time and generating time data; wherein the scanner includes:

an image sensor for converting an image light of the document into an image signal;

an optical unit for projecting the image light of the document to the image sensor;

an image signal processing unit for carrying out digital conversion of the image signal into image data;

a reference white plate;

an output compensation unit for updating digital conversion parameters such as an image signal amplification gain of the image signal processing unit so that the image data of the reference white plate projected to the image sensor by the optical unit and converted by the image signal processing unit may become a proper value; and an output compensation unit for controlling the output compensation, wherein:

the time data of the clock unit are read when an operating voltage for reading the document is provided pursuant to switching to the waiting mode at the power supply unit;

whether elapsed time from the last operation time held in a non-volatile memory is equal to or greater than a predetermined value is determined;

if the determination is affirmative, the digital conversion parameters are updated by the output compensation unit, the updated digital conversion parameters stored in the non-volatile memory, and the last operation time is replaced with the present time data; and if the determination is negative, the digital conversion parameters stored by the non-volatile memory are set up to the image signal processing unit.

As described above, when the elapsed time from the last renewal of the digital conversion parameter is short, the updating process is omitted; therefore, the document reading process can be quickly started when the operation mode is switched from pause mode to waiting mode. Further, since the duration of the pause mode does not have to be monitored, and the notice of the duration does not have to be provided to the scanner when the operation mode is switched to the waiting mode, the task of the energy-saving control unit is not remarkably increased. Further, since control of output compensation, such as AGC, is performed when the elapsed time from the latest control of output compensation, such as AGC, is longer than a predetermined amount, the quality of reading image data is maintained high.

Further, according to the document reading apparatus of the present invention, the optical units do not have to be driven to a document reading position after returning to waiting mode from pause mode, and the width of the document can be immediately detected, the optical unit being for projecting the image light of the document to the image sensors, time that would be otherwise required is not taken, and efficient operations are maintained even if the energy-saving power supply unit is employed.

The present invention further provides an image formation apparatus that includes:

the document reading apparatus of present invention;

a printer for printing the image of the image data to a recording medium;

an image input/output processing unit for converting the image data provided by the document reading apparatus into image data used for image formation by the printer;

an inputting unit for inputting directions of document reading by the document reading apparatus, and directions of printing by the printer; and a reading/printing control unit for controlling document reading and printing in response to the input directions of document reading and printing.

DESCRIPTION OF THE PREFERRED EMBODIMENTS

In the following, embodiments of the present invention are described with reference to the accompanying drawings.

Embodiment 1

Figure 1:
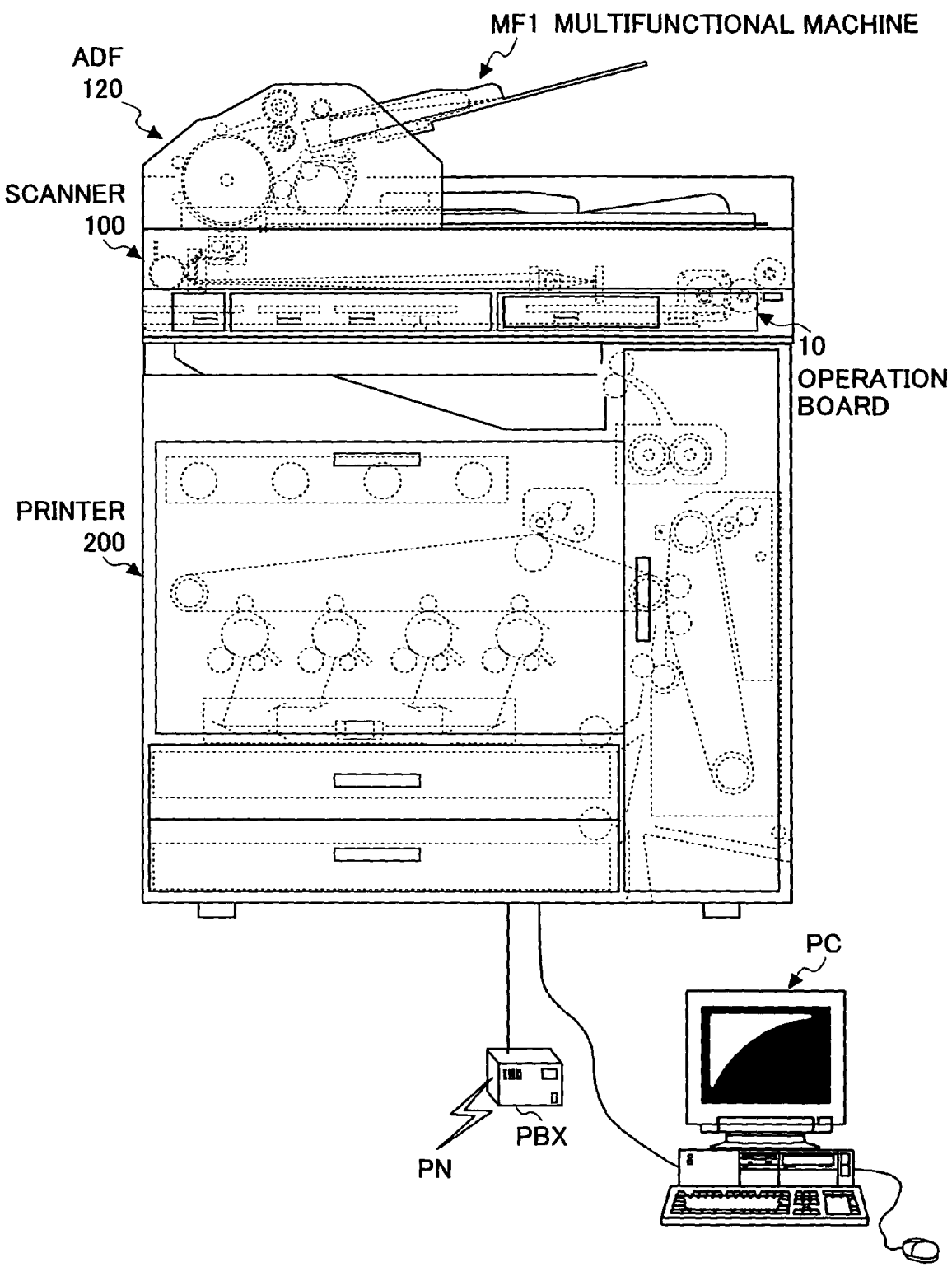
FIG. 1 is a cut-away front view showing the outline of a multifunctional machine MF1 according to the Embodiment 1 of the present invention.

The outline of a multifunctional machine MF1 according to the Embodiment 1 of the present invention is shown in FIG. 1. The multifunctional machine MF1, which is a full color digital multifunctional machine, includes an automatic document feeder ADF 120, an operations board 10, a scanner 100, and a printer 200. Here, the operations board 10, the scanner 100, and the ADF 120 are units that can be separated from the printer 200; and the scanner 100 includes a control board that has a power device driver, a sensor input, and a controller, communicates with an engine controller (i.e., CPU 301 shown in FIG. 5) directly or indirectly, the timing control being carried out, and performs reading of a document image.

Figure 5:
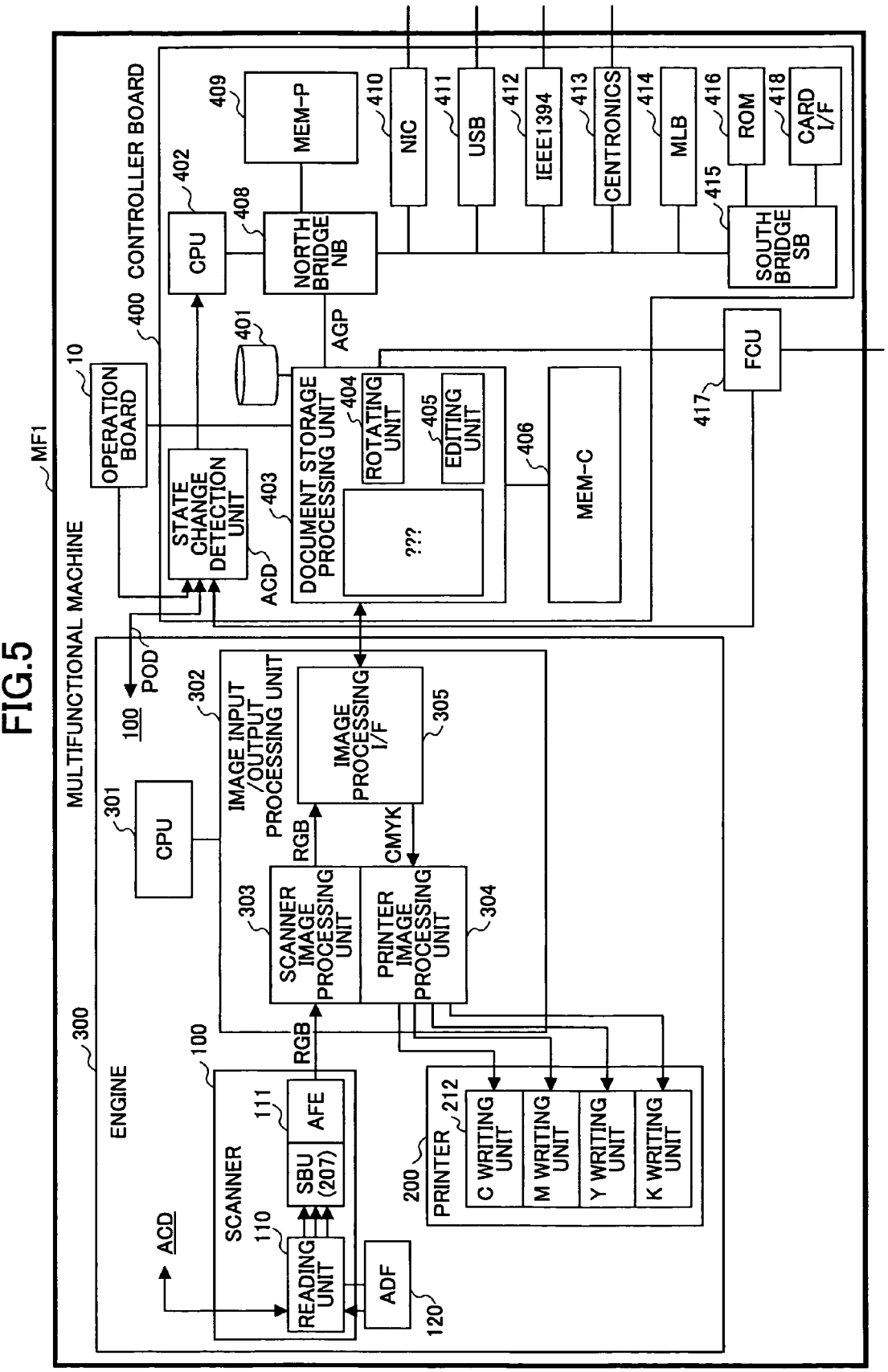
FIG. 5 is a block diagram showing the configuration of an image processing system of the multifunctional machine MF1 shown in FIG. 1.

A controller board 400 (FIG. 5) is connected to the engine 300 (FIG. 5) and to a LAN (Local Area Network). To the LAN, a personal computer PC is connected. The engine 300 includes the scanner 100, the printer 200, and an image input/output processing unit 302 (FIG. 5). To a facsimile control unit FCU 417 (FIG. 5), a switchboard PBX that is connected to the telephone line PN (facsimile communication line) is connected.

Figure 2:
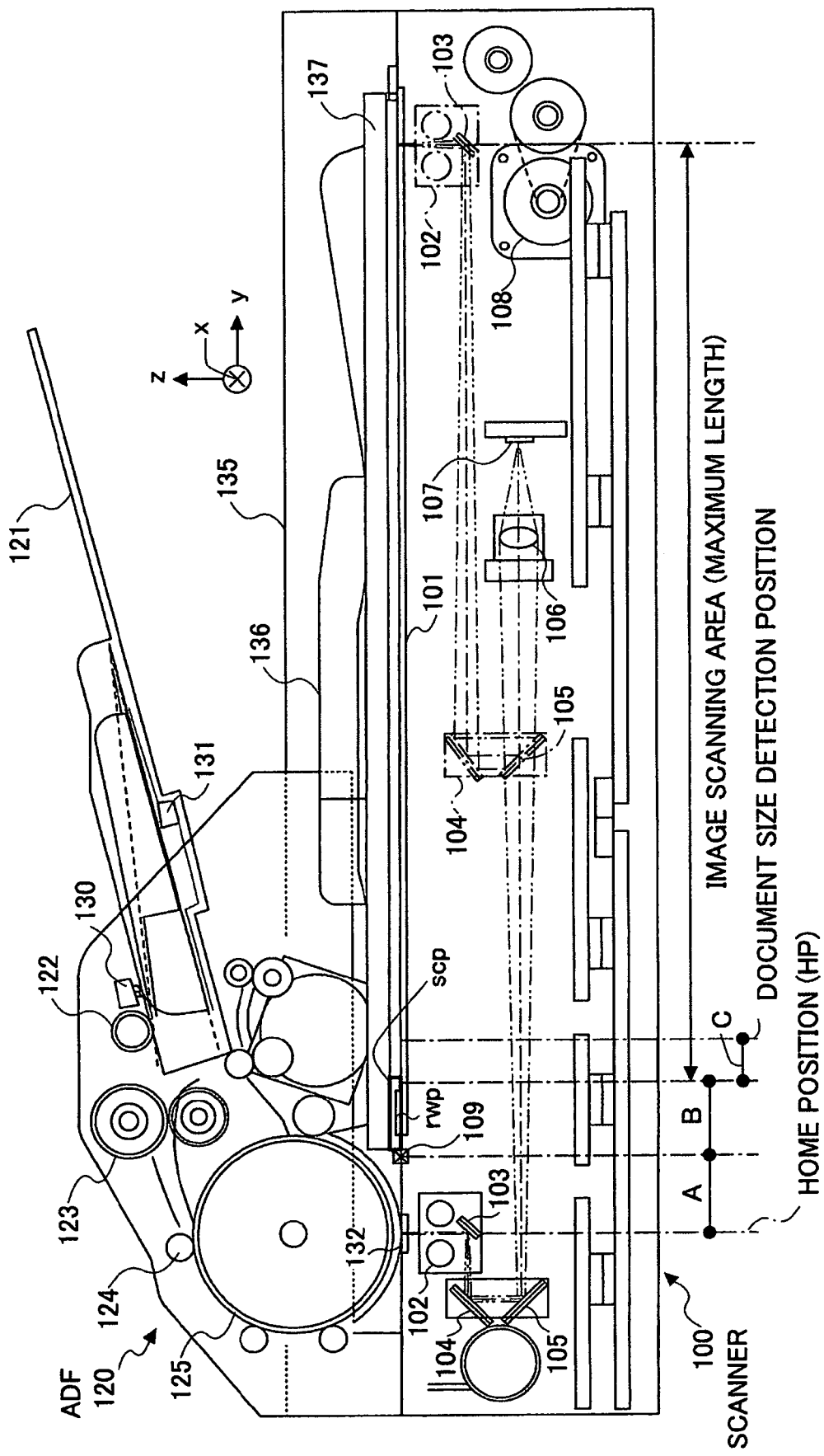
FIG. 2 is an enlarged cut-away front view of a scanner 100 and ADF 120 shown in FIG. 1.

Document image reading mechanisms of the scanner 100 of the multifunctional machine MF1 and the ADF 120 are described with reference to FIG. 2. A document is placed on a contact glass 101 of the scanner 100, and is illuminated by a luminous source 102; then, the light reflected by the document (image light) is reflected in parallel with a vertical scanning direction, i.e., in a direction y, by a first mirror 103. The luminous source 102 and the first mirror 103 are driven in the vertical scanning direction y by a first carriage (not illustrated) that moves at a predetermined constant speed. A second mirror 104 and a third mirror 105 are mounted on a second carriage (not illustrated) that is driven in the same direction as the first carriage at a speed that is one half of the predetermined constant speed of the first carriage. The image light reflected by the first mirror 103 is reflected downward (z) by the second mirror 104, and then it is reflected in the vertical scanning direction y by the third mirror 105. Then, the image light is converged by a lens 106, irradiated to CCD 107, and converted into an electrical signal. Here, conversion is performed into RGB color image signals.

Here, a driving motor 108 drives the first and second carriages to and from, i.e., scanning and return, respectively, in the directions of y. Although the scanner 100 is mainly described as a flat bed reading type, wherein the scanner 100 scans the document placed on the contact glass 101 by the luminous source 102 and the mirror 103, and projects a document image to the CCD 107, it is also capable of sheet-through reading with the first carriage being stopped at a home position HP (waiting position).

In order to perform sheet-through reading, the scanner 100 includes the automatic document feeder ADF 120, a glass 132 serving as a sheet-through reading window that is provided in an imaging scope position of the first mirror 103 when the first carriage is stopped at the home position HP, and a resist roller (platen) 125 of the ADF 120 that is provided countering the glass 132.

The document loaded into a document tray 121 of the ADF 120 is detected by a filler sensor 130. Then, document size is determined based on an ON/OFF state of a switch group 131 for detecting a setting position of a side board that forces a predetermined posture of the document. In the case of sheet-through reading, the topmost sheet of the document loaded into the document tray 121 of the ADF 120 is conveyed to a resist roller 125 by a pickup roller 122 and sending rollers 123 and 124. The document is then conveyed to the window (sheet-through reading window) 132 from the resist roller 125. At this time, an image on the document is reflected by the first mirror 103 that is in the home position HP to the second mirror 104, and then, the image is projected to the CCD 107. The CCD 107 converts the projected image into an image signal. That is, RGB color signals are generated.

According to the present embodiment, the home position HP serves as the sheet-through reading position of the image reading optical unit, and also serves as a starting point (=a return terminal point) of the first carriage when it is driven in the flat bed type operation. In the case of flat bed reading, the first carriage is driven from the home position HP, and image reading starts at a distance A+B measured from the home position HP (right end of a scale plate scp). That is, the image signal generated by the CCD 107 is valid from this point and on. Between the home position HP and the image reading start position, a reference point sensor 109 for detecting the first carriage, and a reference white plate rwp are provided. The reference white plate rwp is provided being stuck to the upper surface of the left end section of the contact glass 101. The reference white plate rwp is prepared in order to rectify a phenomenon called shading (shading compensation). Shading occurs due to variation of luminescence intensity of the luminous source 102, variation in the horizontal scanning direction x, sensitivity unevenness of pixels of the CCD 107, etc. Further, the reference white plate is also used when performing automatic gain control (AGC) of the image signal.

In the case of flat bed reading, the vertical scanning drive of the first carriage and a trace of a vertical scanning position are started from the home position HP. When the reference white plate rwp is in the imaging scope of the first carriage, the image signal (i.e., image data converted into a digital signal) of the CCD 107 is provided to the image signal processing unit AFE 111 (FIG. 5). When the first carriage crosses the reference point sensor 109, starting of the first carriage is completed and it is moving at a predetermined scanning speed. When the vertical scanning position reaches the starting position (right-hand side of the right end of the scale plate scp: A+B), an image signal enable signal (frame synchronization signal: FGATE) is switched to a significant level. In the case of flat bed reading, the first carriage is driven to the end tip (right end) of the document on the contact glass 101, returns toward the home position, and is stopped at the home position HP. Immediately before reaching the home position HP, the first carriage is detected by the reference point sensor 109, and the vertical scanning position is initialized by reference point position data (predetermined point) when the first carriage is detected. Then, the first carriage is driven to a document size detection position (A+B+C) after stopping at the home position HP, and the first carriage waits for a next operation.

Figure 3:
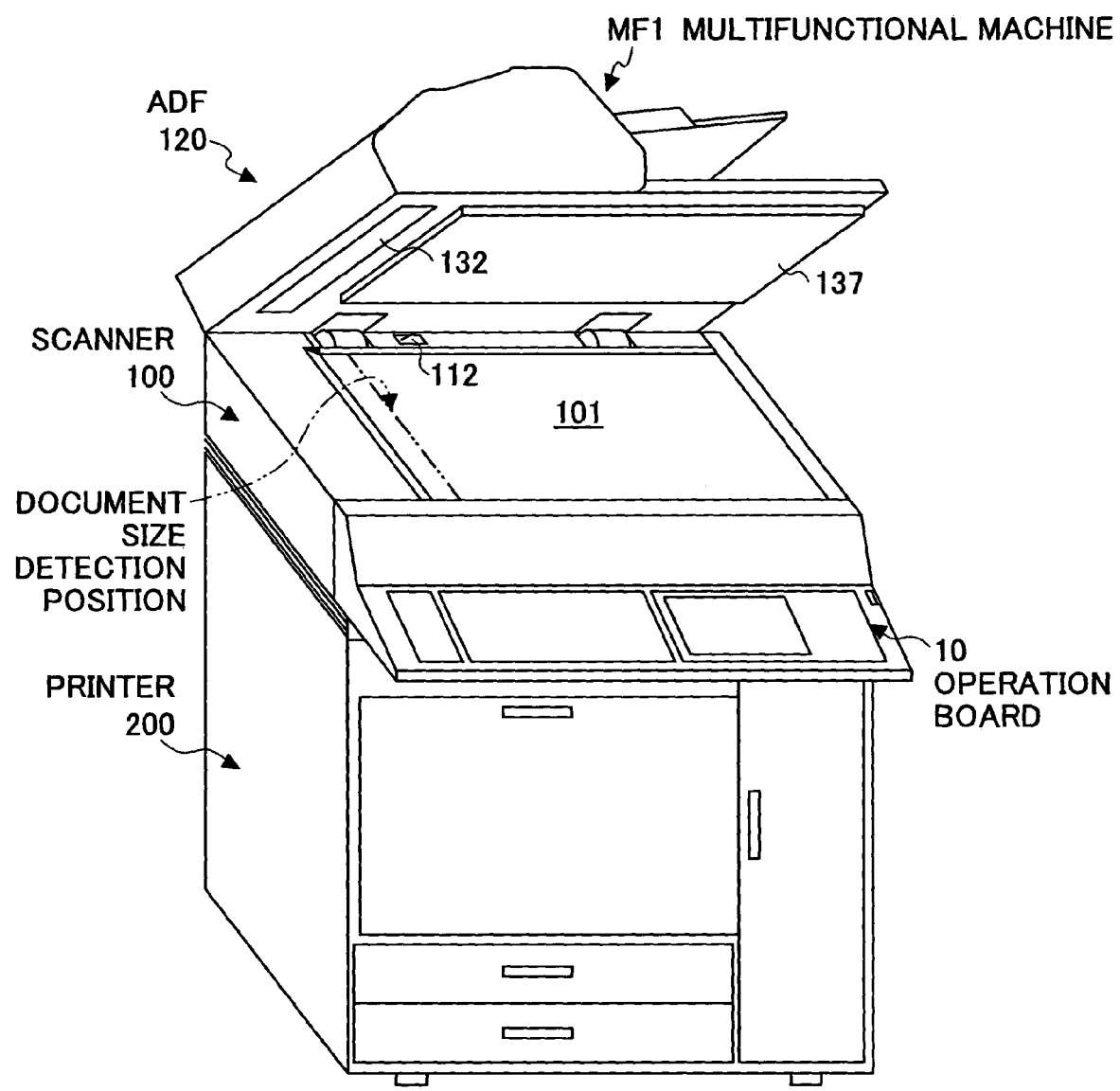
FIG. 3 is a perspective diagram of the multifunctional machine MF1, wherein the ADF 120 shown in FIG. 1 is lifted up (open) from the original covering position (closed)

A base 135 of the ADF 120 is affixed to a base of the scanner 100 on the rear side (rear of FIG. 2) by a hinge; and the ADF 120 is opened by pulling up the base 135 with a handle 136 provided on the front side of the base 135 as shown in FIG. 3. A pressurization plate switch 112 is provided on the rear side of the base 135 of the ADF 120 for detecting opening and closing of the ADF 120. According to the present embodiment, the pressurization plate switch 112 is turned on when an angle between the undersurface of a pressurization plate (document control board) 137 and the document placement side of the contact glass 101 exceeds a predetermined angle, which is about 30°, while the ADF 120 is being opened (from the state shown in FIG. 1 to the state shown in FIG. 3); and the pressurization plate switch 112 is turned off when the angle becomes less than the predetermined angle.

The predetermined angle, at which the pressurization plate switch 112 turns ON and OFF, is set relatively great at about 30°. This is for detecting a width of the document in the horizontal scanning direction x, i.e., the boundary of the document and the background based on the image signal of the CCD 107. The width of the document is detected when the ADF 120 is being closed, i.e., the angle (between the ADF 120 and the contact glass 101) becoming smaller than the predetermined angle, wherein the luminous source 102 on the first carriage that is beforehand positioned at the document size detection position (FIG. 2 and FIG. 3) illuminates the document on the contact glass 101, and the document image is projected to the CCD 107. When the ADF 120 inclines about 10° or greater, the light of the luminous source 102 is reflected and reaches the CCD 107; wherein the light reflected by the document on the contact glass 101 is brightly detected by the CCD 107, and the light reflected by the undersurface of the pressurization plate 137 is darkly detected by the CCD 107, since the undersurface is inclined and the light reflected outside of the document mostly goes out of the imaging scope of the CCD 107. According to the brightness and darkness, the size of the document on the contact glass 101 is determined by a document size detecting unit 48 (FIG. 6) as described below.

According to the present embodiment, document image reading can be performed in the following two modes, namely, manual placement mode, and sheet-through mode.

1. Manual Placement Document Reading:

The user opens the ADF 120, places a document on the contact glass 101, and closes the ADF 120 with the pressurization plate 137 pressing down the document. Then, the flat bed type document scan is performed. When the first carriage passes immediately under the reference white plate rwp, shading compensation data are generated based on the read image data of the reference white plate rwp, the shading compensation data replacing previous shading compensation data stored in the memory. After flat bed reading is finished, the user opens the ADF 120, and takes out the document. When the user has placed the document on the contact glass 101 and closes the ADF 120, the document size detecting unit 48 (FIG. 6) detects the size of the document on the contact glass 101.

2. Sheet-Through Reading:

A document on the document tray 121 is transported by the ADF 120, and sheet-through reading is performed. When transporting the document from the tray 121, the first carriage is driven to the position of the reference white plate rwp, and then driven to the home position HP. When the first carriage comes immediately under the reference white plate rwp, an image of the reference white plate rwp is read, and shading compensation data are generated based on the read image of the reference white plate rwp. The shading compensation data replace previous shading compensation data stored in the memory. Sheet-through reading is performed for every sheet of the document placed on the document tray 121.

Figure 4:
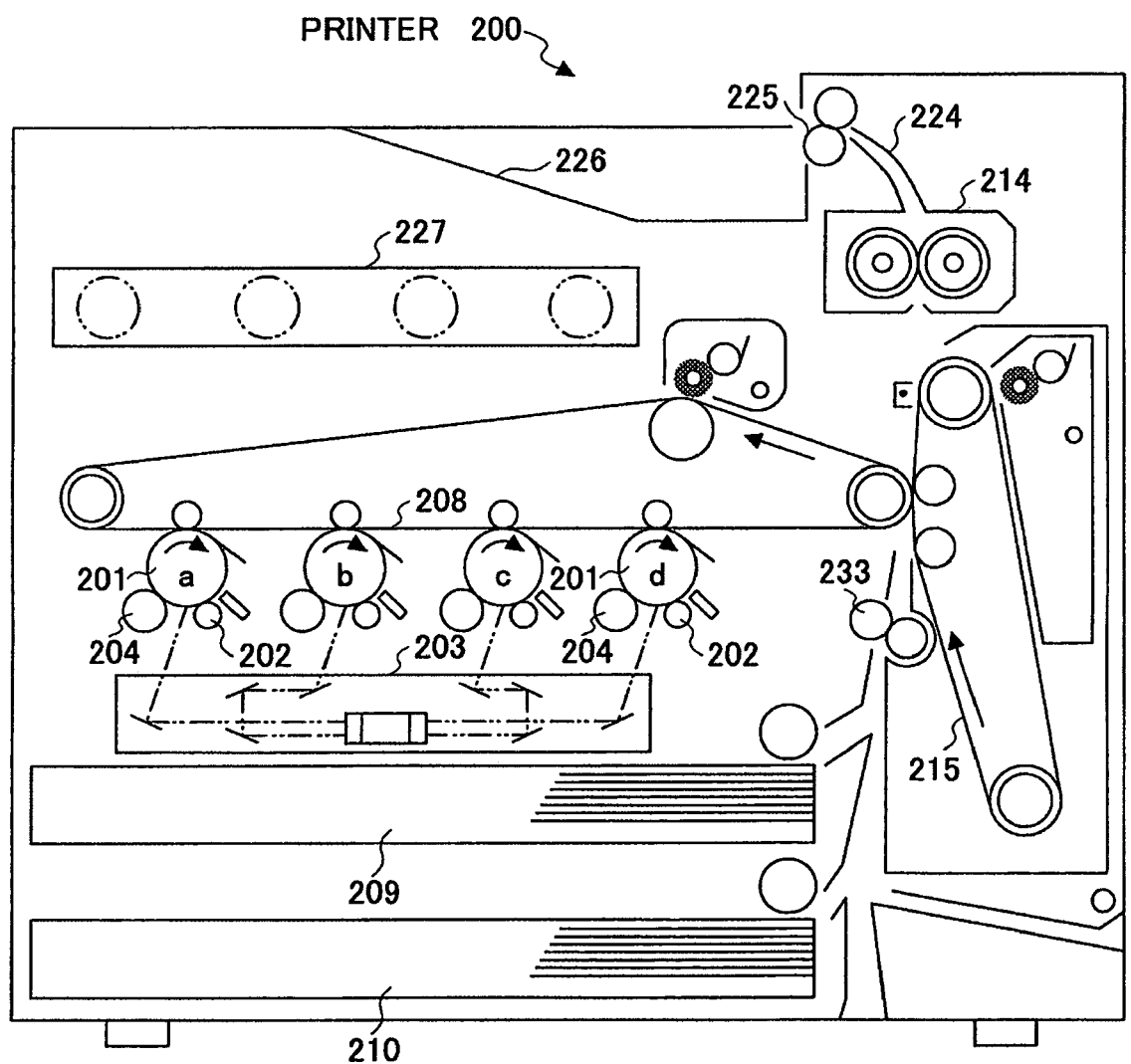
FIG. 4 is an enlarged cut-away front view of a printer 200 shown in FIG. 1.

The mechanism of the printer 200 of the multifunctional machine MF1 according to the embodiment is shown in FIG. 4. The printer 200 is a laser beam color printer. The printer 200 includes four toner image formation units a, b, c and d for forming images in colors of magenta (M), cyan (C), yellow (Y), and black (K), respectively. The toner image formation units a, b, c, and d are arranged in this order along the moving direction of a first imprint belt 208, i.e., from the left to the right (in a direction y) in FIG. 4. That is, it is a full color image formation apparatus with 4 drums, i.e., a tandem system.

Each of the toner image formation units a, b, c, and d includes a photo conductor 201 that rotates clockwise, i.e., in the direction of an arrow as shown in FIG. 4. An electric discharger, a cleaning unit, an electrification unit 202, and a development unit 204 are arranged along the perimeter of the photo conductor 201. Between the electrification unit 202 and the development unit 204, there is a space such that optical information can be provided by an exposure unit 203. Each of the four photo conductors 201 (namely, a, b, c, and d) have an electric discharger, cleaning unit, electrification unit 202, and development unit 204. The colors of the toner contained in the development units 204 differ. A part of each of the four photo conductors 201 is in contact with the first imprint belt 208. A belt-like photo conductor is also employable.

The first imprint belt 208, which constitutes a first loop, is moved in the direction of an arrow shown in FIG. 4, being wound around a support roller and a drive roller that rotate. A first imprint roller is arranged on the backside (i.e., inner side of the first belt loop) near the photo conductor 201. The cleaning unit for the first imprint belt 208 is arranged on the outside of the first belt loop. The cleaning unit removes unnecessary toner that remains on the surface of the first imprint belt 208 after imprinting a toner image from the first imprint belt 208 to one of imprint paper (recording medium) and a second imprint belt 215, as applicable. The exposure unit 203 employs a well-known laser method, wherein the optical information for full color image formation is irradiated to the photo conductor surface that is uniformly charged to produce a latent image. The exposure unit can be structured with a light emitting diode array and an imaging unit.

The second imprint belt 215, which constitutes a second belt loop, is arranged on the right-hand side of the first imprint belt 208 as shown in FIG. 4. The first imprint belt 208 contacts the second imprint belt 215, and an imprint nip is formed. The second imprint belt 215 is wound around a support roller and a drive roller, and the second imprint belt 215 is rotational in the direction of an arrow as shown in FIG. 4. A second imprint unit is arranged on the backside of the second imprint belt 215 (i.e., inner side of the second belt loop). A cleaning unit, a charger, and the like for the second imprint belt are arranged on the outside of the second belt loop. The cleaning unit removes unnecessary toner that remains on the second imprint belt 215 after imprinting the toner image to the recording medium. The recording media are loaded onto feed cassettes 209 and 210, and the topmost sheet is conveyed to a resist roller 233 by a feed roller through two or more form guides. Above the second imprint belt 215, a fixing unit 214, a delivery guide 224, a delivery roller 225, and a delivery stack 226 are arranged. In the upper part of the first imprint belt 208 and under the delivery stack 226, a storage unit 227 for storing spare toners is arranged. The toners are in four colors of magenta, cyan, yellow, and black, and come in the form of cartridges. Toner materials (powder) are provided to the corresponding development units 204 by a fine-particle pump, and the like.

In the following, double-side printing operations are described. First, imaging by the photo conductor 201 is performed. Specifically, by operations of the exposure unit 203, a light from a luminous source (not illustrated) reaches the photo conductor 201 of the imaging unit "a" out of the photo conductors 201 that are uniformly charged by the corresponding electrification units 202 through optical components (not illustrated) such that a latent image for the first color (magenta in this example) is formed. The latent image formed on the photo conductor 201 is developed by the development unit 204, and a patent image, i.e., a toner image in magenta color is formed and held on the surface of the photo conductor 201. The toner image is imprinted onto the surface of the first imprint belt 208 that moves in sync with the photo conductor 201. The surface of the photo conductor 201 is cleaned by the cleaning unit in order to remove toner that remains, and is discharged by the electric discharger. Then, the photoconductor 201 is prepared for the next imaging cycle.

The first imprint belt 208 holds the toner image in magenta color imprinted on its surface, and moves in the direction of the arrow. A latent image of the next color (cyan in this example) is formed by the photo conductor 201 of the imaging unit b, the latent image being developed by the corresponding development unit 204 of the corresponding color, and a patent image (toner image in magenta) is obtained. The second patent image in magenta is superposed on the first patent image on the first imprint belt 208. This process is repeated such that a first toner image in the 4 colors is obtained. In addition, it is possible that a monochrome image only in black is formed. At this time, the second imprint belt 215 is moving in sync with the first imprint belt 208 in the direction of the arrow, and the first toner image on the surface of the first imprint belt 208 is imprinted on the surface of the second imprint belt 215. Since the first and the second imprint belts 208 and 215 move and imaging is advanced while the images are being formed on the photo conductors 201 of the four imaging units "a" through "d" in this tandem system, the time for image formation can be shortened. When the first imprint belt 208 reaches a predetermined place, a second toner image that is to be printed on the other side of the recording medium is formed on the photo conductors 201 according to the process as described above, and feeding of the recording medium is started. The recording medium at the topmost in the feed cassette 121 or 122 is pulled out, and conveyed by the resist roller 233. The second toner image on the surface of the first imprint belt 208 is imprinted on a first side of the recording medium inserted between the first imprint belt 208 and the second imprint belt 215 through the resist roller 233. Then, the recording medium is conveyed upward, and the first toner image on the surface of the second imprint belt 215 is imprinted on a second side of the recording medium. When imprinting, timing of conveyance is taken so that the first and second toner images are correctly positioned.

The recording medium, on which the toner images are imprinted on both sides as described above, is sent to the fixing unit 214, wherein the toner images are fused and fixed to the recording medium. Then, the recording medium passes the delivery guide 224, and is discharged by the delivery rollers 225 to the delivery stack 226 provided at an upper part of the main frame of the printer 200.

Since the recording medium is discharged as described above with reference to FIG. 4, the first side of the recording medium carrying the second image directly imprinted by the first imprint belt 208 becomes the undersurface when the recording paper is delivered to the delivery stack 226. Accordingly, if page setting is desired, the second image is first produced, transferred to the second imprint belt 215, and the first image is directly imprinted on the first side of the recording medium by the first imprint belt 208. The image directly imprinted by the first imprint belt 208 is a positive image (non-reversal image) on the photo conductor surface, and the toner image imprinted by the second imprint belt 215 is exposed so that the image becomes a reversal image (mirror image) on the photo conductor surface. A process for page setting (i.e., sequence of imprinting onto the first imprint belt 208, switching between positive and mirror images, and the like) is performed by a document storage processing unit 403 (FIG. 5) for controlling writing/reading of image data to/from a local memory (MEM-C) 406. After imprinting from the second imprint belt 215 onto the recording medium, a cleaning unit including a brush roller, a recovery roller, and a blade removes unnecessary toner and unnecessary paper powder that may remain on the second imprint belt 215.

FIG. 4 shows a state wherein the brush roller of the cleaning unit for the second imprint belt 215 is separated from the surface of the second imprint belt 215. The cleaning unit can rock (swing) centering on a supporting point such that the cleaning unit can contact and separate from the surface of the second imprint belt 215. The cleaning unit is separated while the second imprint belt 215 holds the toner image that is to be imprinted onto the recording medium; and when cleaning is to take place, it rocks counterclockwise such that it contacts the second imprint belt 215. The removed toner is collected into a toner compartment. The image formation process in the "double-side imprint mode" is described above.

In the case of one side printing, "one side imprint mode by the second imprint belt 215" and "one side imprint mode by the first imprint belt 208" are available. When the former (the one side imprint mode by the second imprint belt 215) is selected, a patent image formed on the first imprint belt 208 in multi-colors or monochrome black, as applicable, is imprinted on the second imprint belt 215, and then is imprinted on one side of the recording medium. There is no imprinting on the other side of the recording medium. In this case, the upper surface of the recording medium as delivered to the delivery stack 226 bears the image.

When the latter (the one side imprint mode by the first imprint belt 208) is selected, the patent image formed on the first imprint belt 208 in multi-colors or monochrome black, as applicable, is imprinted on one side of the recording medium without the second imprint belt 215 imprinting. There is no imprinting on the other side of the recording medium. In this case, the lower surface of the recording medium as delivered to the delivery stack 226 bears the image.

FIG. 5 shows the configuration of an image processing system of the multifunctional machine MF1 of FIG. 1. The multifunctional machine MF1 includes the operations board 10, the controller board 400, and the engine 300 for reading a document image and for color printing. The engine 300 includes CPU 301 for controlling image reading and printing processes, the scanner 100, the printer 200, and an image input/output processing unit 302 constituted by an ASIC (Application Specific IC).

The scanner 100 includes a reading unit 110 that includes CPU, ROM, and RAM, wherein the CPU controls the scanner 100 by loading a program stored in the ROM into the RAM, and by executing the program. Further, the scanner 100 is connected to CPU 301 for process control through a communication line, and performs directed operations by sending and receiving commands and data. The CPU of the reading unit 110 carries out detection and an ON/OFF control of the filler sensor 130 (document detection sensor), the reference point sensor 109, the pressurization plate switch 112, a cooling fan, etc. The reading unit 110 includes a scanner motor driver that is driven by PWM provided by the CPU, and generates an excitation pulse sequence for driving a stepping motor for document scanning.

The document is irradiated by the luminous source 102 (FIG. 2), which is a halogen lamp, and reflects the light, i.e., an optical signal. The optical signal is provided to CCD 107 through the mirrors 103 through 105 and a lens 106. The CCD 107 includes three line sensors, one each for R, G, and B signals, and provides analog image signals of each RGB pixel to the digital processing circuit AFE 111. The AFE 111, serving as an image signal processing unit, amplifies the image signals, converts the image signals into digital image data, and compensates for shading.

The controller board 400 includes the document storing control unit 403 constituted by a CPU 402 and an ASIC, a hard disk drive unit (HDD) 401, local memory (MEM-C) 406, a system memory (MEM-P) 409, a north bridge (NB) 408, a south bridge (SB) 415, a NIC (Network Interface Card) 410, a USB interface 411, an IEEE 1394 interface 412, a Centronics interface 413, etc. The operations board 10 is connected to the document storing control unit 403 of the controller board 400. The facsimile control unit (FCU) 417 is also connected to the document storing control unit 403 through a PCI bus.

The CPU 402 is capable of communicating (transmitting and receiving) document information with a personal computer PC connected to a LAN or another personal computer PC connected to the Internet through the NIC 410. Further, the CPU 402 is capable of communicating with a personal computer, a printer, a digital camera, etc., using the USB interface 411, the IEEE 1394 interface 412, and the Centronics interface 413.

The SB 415, NIC 410, USB interface 411, the IEEE 1394 interface 412, the Centronics interface 413, and an MLB 414 are connected to the NB 408 through the PCI bus. That is, the MLB 414 is connected to the engine 300 through the PCI bus. Further, the MLB 414 converts document data input by an external device into image data, and outputs the converted image data to the engine 300.

The local memory 406, HDD 401, etc., are connected to the document storing control unit 403 of the controller board 400. The CPU 402 and the document storing control unit 403 are connected through the NB 408 of the CPU chip set. The document storing control unit 403 and NB 408 are connected through an AGP (Accelerated Graphics Port).

The CPU 402 controls operations of the multifunctional machine MF1. The NB 408 is a bridge for connecting such as the CPU 402, the system memory 409, SB 415, and the document storing control unit 403. The system memory 409 serves as storage for the multifunctional machine MF1 to draw an image among other things. The SB 415 is a bridge for connecting such as the NB 408, the PCI bus, and peripheral devices. The SB 415 is further connected to a card IF 418 for reading/writing an external ROM and SD memory card (SD card). A SD card reading/writing apparatus (Card Reader) is connected to the card IF 418 so that data held by the SD card are read, and data can be written to the SD card.

The local memory 406 serves as an image buffer for copying, and a code buffer. HDD 401 is for storing image data, document data, programs, font data, forms, look-up tables (LUT), etc. Further, the operations board 10 is for displaying to the user and for receiving input operations from the user.

FIG. 5 shows a flow of the image data exchanged between the image input/output processing unit 302, the scanner 100, and the printer 200. The image input/output processing unit 302 includes a scanner image processing unit 303 for performing γ compensation, MTF compensation, etc., for each of R, G, and B image data generated by the scanner 100 reading the document; a printer image processing unit 304 for converting the R, G, and B image data into c, m, y, and k recording color data (printing data) suitable for image expression properties of C, M, Y, and K of the printer 200; and an image processing I/F (Interface circuit) 305 for providing the RGB image data of the read document to the document storing control unit 403, and for providing the RGB image data output by the document storing control unit 403 to the printer image processing unit 304.

When copying a monochrome document, G image data are output to the image processing I/F 305 from the scanner image processing unit 303; the image processing I/F 305 outputs the G image data to the printer image processing unit 304; the printer image processing unit 304 converts the G image data into k recording color data; adjusts scale; performs image processing, as required; performs printer γ conversion, and gradation processing; and outputs to a K writing unit 212 of the printer 200. With the k recording color data output by the image processing unit 304, the writing unit 212 modulates, or turns on and off, an electric current provided to the laser light emitting diode of the optical scanning unit 203 (FIG. 4).

When copying a color document, the RGB image data output by the scanner image processing unit 303 are temporarily stored by one of the local memory 406 and the HDD 401, or alternatively stored by the HDD 401 through the image processing I/F 305 and the image storage control unit 403, and are read such that the data are used for copying or printing, or the data are sent out to an external destination.

When printing image data, which are stored or received from an external source, with the printer 200, the image data are provided to the printer image processing unit 304 through the image storage control unit 403 and the image processing I/F 305. The printer image processing unit 304 converts the provided image data into cmyk recording color data; adjusts scale, and performs image processing, as required; performs printer γ conversion, and gradation processing; and outputs the processed data to the corresponding writing units 212.

Detection signal lines of the pressurization plate switch 112 of the reading unit 110 and the filler sensor 130 of ADF 120, a key stroke detection signal line of a power supply key switch 21 of the operation board 10, and a reception detection signal line of the facsimile controller 417 are connected to a state change detection unit ACD of the controller board 400. While a main power switch 79 (FIG. 10) is turned on, even if the power supply unit 80 is in a pause mode, an operating voltage +5 VE is kept being provided to the state change detection unit ACD. So long as the operating voltage +5 VE is provided, if there is a signal change in any one of the signal lines connected to the detection circuit ACD, a change detection signal representing the signal change is provided to the CPU 402. Then, the CPU 402 in response to the change detection signal turns the power supply unit 80 to the standby mode.

The state change detection unit ACD includes a power supply ON reset circuit for generating a reset pulse when the operating voltage +5 VE is applied during the pause mode (i.e., when a main power switch 79 is turned ON from OFF), and a latch for keeping a power-on mode signal POD to low L ("0"), POD being an output of the latch and reset by the reset pulse. The latch is a flip-flop, the Q output of which is the power-on mode signal POD. When the CPU 402 switches the power supply unit 80 to standby mode from pause mode, the latch is set and the power-on mode signal POD, which is the output of the latch, is switched to high-level H ("1") (Step 6a of FIG. 11). That is, if the power supply unit 80 is in standby mode because the main power switch 79 is turned ON from OFF, the power-on mode signal POD is set to "0"; and if the power supply unit 80 is in standby mode because of switching from pause mode to standby mode, the power-on mode signal POD is set to "1". The power-on mode signal POD is referred to when the scanner 100 determines whether the operating voltage is provided to the scanner 100 because of the main power switch 79 being turned on, or because of the state change to standby mode from pause mode by the CPU 402 (Step 22 of FIG. 13).

Figure 6:
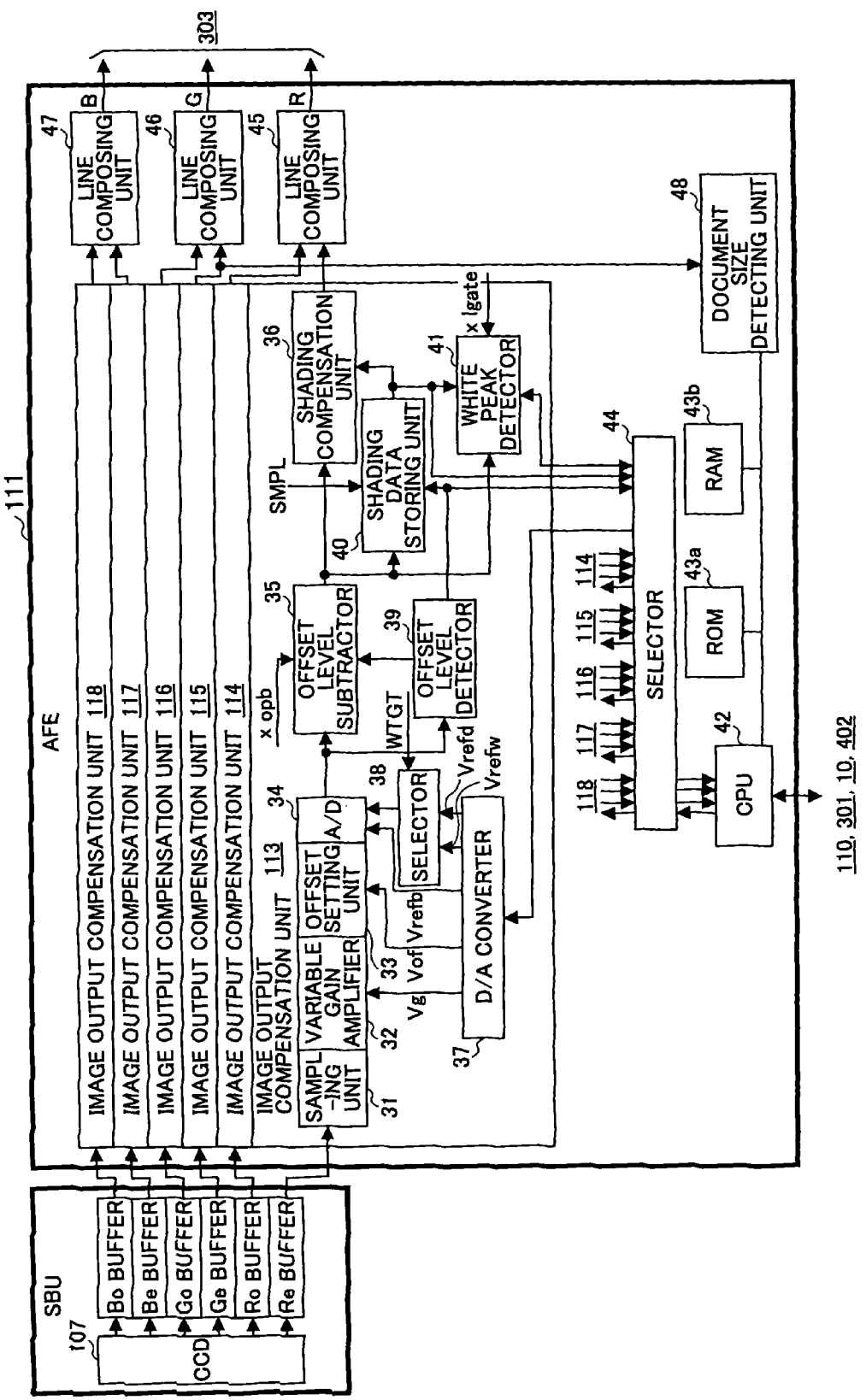
FIG. 6 is a block diagram showing the functional configuration of an image signal processing circuit AFE 111 shown in FIG. 5.

The outline of image signal processing performed by a sensor board unit SBU (207, ref. FIG. 5) and the AFE 111 of the scanner 100 is described with reference to FIG. 6. The CCD 107 provides R, G, and B image signals, each consisting of an even number pixel sequence and an odd number pixel sequence. The even number pixel sequence and the odd number pixel sequence of each color image signal are individually amplified by corresponding buffer amplifiers, and are provided to corresponding image output compensation units 113 through 118 of the AFE 111. Although only the detailed configuration of the image output compensation unit 113 for converting the even number pixel sequence of the image signal of R into digital data is shown in FIG. 6, the image output compensation units 114 through 118 have the same configuration as the image output compensation unit 113. Description of functions of the image output compensation unit 113 follows.

The even number pixel sequence of the color R that is an analog image signal output by the CCD 107 is driven by a Re buffer amplifier of the SBU 207; and a sampling unit 31 holds a sample, and removes RF components, such as reset noise. A variable gain amplifier 32 amplifies at a gain that is controlled by a control voltage Vg applied to a control terminal of the variable gain amplifier 32. An offset setting unit 33 sets up an offset level, positive or negative, depending on a control voltage Vof applied to a control terminal of the offset setting unit 33. The control voltages Vg and Vof are determined by the CPU 42 operating a D/A converter 37. If the D/A converter 37 is of 8 bits, for example, the CPU 42 sets up a value ranging between 0 and 255 to the D/A converter 37, and the D/A converter 37 outputs a corresponding voltage.

The A/D conversion circuit 34 is for converting an analog image signal into a digital image signal, i.e., image data, at a predetermined resolution (for example, 8 bits) based on an upper limit Vrefd or Vrefw, as applicable, and a lower limit Vrefb. The image data are provided to an offset level detector 39 and an offset level subtractor 35. Here, the CPU 42 determines the upper limit Vrefw, the upper limit Vrefd, and the lower limit Vrefb by operating the D/A converter 37. The D/A converter 37 provides the upper limits Vrefw and Vrefd to a selector 38. When reading the reference white plate rwp, the selector 38 provides the upper limit Vrefw to an A/D conversion circuit 34; and when reading a document, the selector 38 provides the upper limit Vrefd to the A/D conversion circuit 34.

The CCD 107 includes a sensor section that is called "optical black (OPB) pixel" that is physically shielded (shaded), and another sensor section called "effective pixel" that outputs a voltage proportional to the amount of incident light. Data of the OPB pixel and the effective pixel are repeatedly output for every horizontal scanning period.

The offset level detector 39 takes in and holds an output of the A/D conversion circuit 34 corresponding to the OPB pixel of the CCD 107 in the period during which an xopb signal is asserted. The offset level is an average of two or more OPB pixels, and is held for each of the output lines of the CCD 107. The offset level subtractor 35 subtracts the offset level stored in the offset level detector 39 from the input value provided by the A/D conversion circuit 34. A white peak detector 41 is for storing a peak value of the image data that are input during a period while an xlgate signal and an SMPL signal are asserted. Here, the xlgate signal represents the effective pixel section when reading the document; and the SMPL signal represents a reading period of the reference white plate. The CPU 42 can obtain the latest offset level value and the latest peak value by accessing the offset level detector 39 and the white peak detector 41, respectively.

A shading data storing unit 40 is for processing, such as averaging, the values obtained by reading the reference white plate rwp, and sequentially storing the processed values of each pixel. A shading compensation unit 36 is for performing shading compensation of the read image data using the compensation data stored in the shading data storing unit 40. The CPU 42 becomes ready to read image data of a specific pixel (located in the horizontal scanning direction x of the reference white plate rwp) after storing the image data obtained by reading the reference white plate in a line memory of the shading data storing unit 40, to which line memory, image data for averaging image data between lines are temporarily stored.

The output of the A/D conversion circuit 34 is delayed due to A/D conversion. The xopb is an offset level data range definition signal that is asserted for a predetermined period at the timing of the A/D conversion output of the read analog signal of the OPB pixel. Since it is known from experiences that noise is less if the second half portion of the read analog signal of the OPB pixel is used, the present embodiment follows this rule. The xlgate is a signal that is asserted in the area wherein the document is read, i.e., the effective pixel section, and is used for specifying reading range when detecting the white peak.

WTGT is a signal that is asserted at the timing when the CCD 107 reads the reference white plate rwp, and is used as a selector switching signal. The selector 38 outputs Vrefw when WTGT is asserted, and outputs Vrefd when WTGT is negated; and the selected voltage is provided to the A/D conversion circuit 34. SMPL is asserted during a part of the period of the timing (WTGT), in which the CCD 107 reads the reference white plate rwp, and directs a timing at which the reference white plate data are taken into a shading data FIFO.

—AGC (Adjustment of Gain, etc.)—

At "AGC (adjustment of gain, etc.)", an operation program stored in ROM 43a is read and written in RAM 43b. Then, if the first carriage moves to the position of the reference white plate rwp, the CPU 42 provides the upper reference voltage Vrefw to the A/D conversion circuit 34, and the peak data Dwp of the reference white plate are read according to the operation program. Next, whether the peak data Dwp fall within a predetermined range Dp±B is determined. Here, Dp is an adjustment target value and is the peak value of the analog image signal provided to the A/D conversion circuit 34, the target value being set no greater than the upper reference voltage Vrefw (considering a margin, it is set to about 80 percent of the upper reference voltage Vrefw). This is for obtaining the desired performance of the A/D conversion circuit 34 so that a digital signal with high precision is obtained. Further, B represents adjustment tolerance.

When the peak data Dwp fall within the predetermined range Dp±B, the control voltage Vg, the lower reference voltage Vrefb, and the upper reference voltages Vrefw and Vrefd are stored in RAM 43*b*. When the peak data Dwp are out of the predetermined range Dp±B, a setup voltage Svg (D/A input) of the D/A converter 37 for outputting the control voltage Vg (D/A output) for controlling the gain is calculated such that Dwp may fall within the predetermined range Dp+B. Then, it is determined whether the calculated Svg falls within a range (between SvgL and SvgH) that the D/A converter 37 is capable of adjusting. If the D/A converter 37 is based on 8 bits, the range that can be set up is between 0 and 255. If the value is within the range, set up is carried out, and the peak data Dwp are read again. If the Svg value is out of the range of the D/A converter 37, one of the values SvgL and SvgH that is the closer to the calculated value is used for set up, the peak data Dwp are read again, and the determination is repeated.

If the peak data Dwp are outside of the predetermined range Dp±B, the CPU 42 calculates the upper reference voltage Vrefw of the A/D conversion circuit 34 for reading the reference white plate rwp. Here, relations between the setup value (input data) of the D/A converter 37 and the reference voltage Vrefw (output voltage) are expressed by Vrefw=f (Srefw), the inverse function of which (f(Srefw)) is expressed by Srefw=g(Vrefw). Then, input data Srefw of the D/A converter 37 for Vrefw that is to be adjusted is expressed by:

$$Srefw=g(Dwp/Dp/(f(Stp)-f(Stb))-f(Stb)); \text{ where}$$

Dp represents peak data expected after changing the setup value Srefw provided to the D/A converter 37 for Vrefw, Stp represents the setup value Srefw provided to the D/A converter 37 when obtaining the peak value Dwp, and Stb represents the setup value Srefb of the D/A converter 37 for Vrefb.

Whether the Srefw calculated as above is within the range (between SrefwL and SrefwH) is determined. For example, if the D/A converter 37 is of 8 bits, the range that can be set up is between 0 and 255. If the calculated Srefw is within the range, the value is actually set up, and the peak data Dwp are read again. When the calculated Srefw is out of the range, i.e., the D/A converter 37 is not capable of adjusting, it is an error, and a value that is the closest to the calculated value within the range is set up, and the process is finished. However, the error occurs only when there is a hardware problem such as pattern disconnection.

Since the reference voltage Vrefw of the reference white plate has been changed, the reference voltage Vrefd for reading the document is to be changed; otherwise, the size of the image data after the shading compensation will be changed. Here, Vrefw for reference white plate reading before the change is called Vrefwb, and the same after the change is called Vrefwa; Vrefd for document reading before the change is called Vrefdb, and the same after the change is called Vrefda; and the lower limit reference voltage is Vrefb. Vrefd is changed such that following relations are obtained.

$$(Vrefwb-Vrefb)/(Vrefwa-Vrefb)=(Vrefdb-Vrefb)/(Vrefda-Vrefb)$$

In other words, the reference voltage Vrefd for document reading of the D/A converter 37 is set at Vrefda that satisfies the formula above.

Then, the CPU 42 sets up a Vrefd value that provides Vrefda, and a Vrefw value that provides Vrefwa. Further, the upper reference voltage Vrefw set up as above, the upper reference voltage Vrefd set up as above, the control voltage Vg under setup, Srefw for setting up the lower reference voltage Vrefb, Srefd, Svg, and Srefb are stored in RAM 43*b*. With this, the AGC (adjustment of gain, etc.) is ended. The setup values obtained by the gain adjustment are provided to the controller board 400, and are stored in a setup data table of the HDD 401, the setup data table being addressed to the AFE 111 (update writing), the HDD 401 being a non-volatile memory. At this time, the last operation time is replaced by the current time. This is performed at step 26 shown in FIG. 13.

In addition, immediately after supplying the power to the scanner 100 (and ADF 120), the CPU 42 of the AFE 111 of the scanner 100 acquires the setup values stored in the HDD 401 from the controller board 400 (HDD 401) and writes them in the RAM 43*b*; and the image output compensation units 113 through 118 shown in FIG. 6 are set up with the corresponding setup values. This is performed at steps 24 and 27 as described below with reference to FIG. 13. The setup is described below.

—Setup of Gain, etc.—

When progressing to the waiting mode wherein a direction to read a document image is awaited (standby mode or low power mode, described below) from power supply OFF or energy-saving mode (pause mode, described below), the CPU 42 reads the setup values, such as adjustment gain, stored in the setup data table of the HDD 401 of the controller board 400, writes them in the RAM 43*b*, and stores (sets up) them in the latch (register) of the D/A converter 37 of each image output compensation unit. That is, the CPU 42 provides the setup value Srefd for Vrefd stored in the HDD 401 to the D/A converter 37, and provides the D/A conversion output voltage Vrefd to the A/D conversion circuit 34 as the upper reference voltage through the selector 38. Further, the setup values Vg, Svg of Vrefb, and Srefb are also provided to the D/A converter 37. Then, if an image signal is provided to the image output compensation unit 113, the image data are converted to digital by the A/D conversion circuit 34 wherein the analog signal of the document is converted into image data that are expressed by discrete values in a predetermined number of steps between the lower reference voltage Vrefb and the upper reference voltages Vrefd.

—Setup of Shading Compensation Data—

When setting up the data for shading compensation in the case that the first carriage is directly under the reference white plate rwp, by the image reading process wherein the setup values, such as a gain adjustment value, are set up to the D/A converter 37 as described above, the CPU 42 reads the reference white plate rwp, generates the shading compensation data for one horizontal scanning line based on the image data, and stores them in the shading data storing unit 40.

—Document Size Detection—

If the first carriage is in the document detection position and the ON/OFF signal of the pressurization plate switch 112 shows that the pressurization plate 137 is closed from an open state, a CPU in the reading unit 110 (FIG. 5) turns on the luminous source 102, drives the first carriage to the home position HP, and the CPU 42 of the AFE 111 directs document size detection to the document size detecting unit 48. The document size detecting unit 48 counts the number of continuous white pixels from the read starting point (side edge section on the backside of the contact glass 101 in the state where the pressurization plate 137 is opened as shown in FIG. 3) to the other end in the horizontal scanning direction x of the image data of each line, takes an average of the counts for a few lines, encodes the average (coding), and outputs the encoded average to the CPU 42. In addition, if a predetermined number of continuous white pixels is not obtained, the document size detecting unit 48 outputs a code that indicates that there is no document to the CPU 42.

—Image Output Compensation—

When reading the document, each of the image output compensation units 113 through 118 of the AFE 111 performs an image process according to corresponding setup values that are read from the setup data table of the HDD 401 and set to the D/A converter 37. Then, the variable gain amplifier 32 amplifies the image signal by the setup gain Vg, and the A/D conversion circuit 34 converts the image signal into image data expressed by the discrete values in the predetermined number of steps between the lower reference voltage Vrefb and the upper reference voltages Vrefd. Since the A/D conversion of the analog image signal into the image data is carried out using the upper reference voltages Vrefw and Vrefd set up at the "AGC (adjustment of gain, etc.)", even if the quantity of light fluctuates over time, the precision of the image data output by the A/D conversion circuit 34 is high, and is stabilized.

The shading compensation unit 36 performs shading compensation to the image data based on the data stored in the shading data storing unit 40. Thereby, image data of each point (image) in the horizontal scanning direction x are compensated for such that the substantially same value of the image data is obtained to the same white level, and the compensated data are output.

Image data of R even number pixel sequence that are compensated for by the image output compensation unit 113 and image data of R odd number pixel sequence that are compensated for by the image output compensation unit 114 are compounded by a line composing unit 45, and are output to the scanner image processing unit 303. Similarly, each set of G and B image data that are compounded into one line is output to the scanner image processing unit 303 from the line composing unit 46 and 47, respectively.

Descriptions of the shading compensation in the case of flat bed reading follow. When a document is placed on the contact glass 101 and the ADF 120 is closed, the pressurization plate switch 112 is turned on. At this time, the first carriage is in the document size detection position and the reading unit 110 turns on the luminous source 102 and starts a return drive of the first carriage to the home position HP. The document size detecting unit 48 of the AFE 111 detects the size of the document placed on the contact glass 101 based on G image data that are provided by the image output compensation unit 115. If the reference point sensor 109 detects the first carriage, the reading unit 110 updates vertical scanning position data with the vertical scanning position (fixed value data) of the reference point sensor 109. While carrying out the vertical scanning drive of the first carriage, the reading unit 110 increments (up-counting driving pulses) the vertical scanning position data in sync with driving pulses of a stepping motor for driving the first carriage if the vertical scanning drive of the flat bed reading of the first carriage is in a direction from left to right with reference to FIG. 2, and decrements (down-counting driving pulses) the vertical position scanning data if the drive is in the opposite direction, i.e., return direction (from right to left with reference to FIG. 2). The reading unit 110 monitors the vertical scanning position, brings the first carriage to the home position, and turns off the luminous source 102.

If the start key 17 is operated (turned on), the reading unit 110 turns on the luminous source 102 and starts the vertical scanning drive for flat bed reading by the first carriage. If the vertical scanning position becomes the area of the reference white plate rwp, the shading data storing unit 40 (FIG. 6) starts reading the read image data of the reference white plate rwp, calculates an average of two or more lines, and calculates a multiplication coefficient value required to make the average of the image data of pixels of one line into image data of a reference white level (for example, 255 or about 80% thereof), which are stored in a FIFO memory of the shading data storing unit 40.

While the vertical scanning position is within the document area, i.e., from starting edge to ending edge of the document, the shading data storing unit 40 reads the multiplication coefficient value of each pixel of one line from the FIFO memory one by one, and provides the multiplication coefficient value to the shading compensation unit 36. The shading compensation unit 36 provides the image data of each pixel of each line of the read document and the multiplication coefficient value of the same pixel simultaneously to a read-out address of ROM included in the shading compensation unit 36. Since the image data after the shading compensation expressed as the product of the image data given as the address and the multiplication coefficient value are stored in the ROM, the image data produced by performing the shading compensation to the image data given as the address are output from the ROM, and are output to the line composing unit 45 of the following stage.

Next, the shading compensation in the case of sheet-through reading is described. When a document is loaded onto the document tray 121, and the start key 17 is operated, the reading unit 110 starts feeding the document from the document tray 121, turns on the luminous source 102, and starts the vertical scanning drive of flat bed reading by the first carriage. When the vertical scanning position comes to the area of the reference white plate rwp, the shading data storing unit 40 (FIG. 6) starts reading image data of the reference white plate rwp, calculates an average of two or more lines, calculates a multiplication coefficient value required to make the average of the image data of each pixel on one line into the image data of the reference white level, and stores the coefficient in the FIFO memory of the shading data storing unit 40. Then, the reading unit 110 starts the return drive of the first carriage to the home position HP, and brings the first carriage to the home position HP. This is finished by the time the tip of the document taken out from the document tray 21 reaches a windowpane 132.

During document reading, i.e., from the time when the tip of a document (first document) comes into the imaging scope of the first carriage positioned at the home position HP until the end of the document exits from the image imaging scope, the shading data storing unit 40 reads the multiplication coefficient value of each pixel of a line from the FIFO memory one by one, and provides the multiplication coefficient value to the shading compensation unit 36. The shading compensation unit 36 performs shading compensation, and outputs the shading-compensated image data to the line composing unit 45.

If another document (second document) is in the document tray 121 when the end of the first document exits from the imaging scope of the first carriage, the reading unit 110 starts sending the second document and starts reading the reference white plate rwp. Subsequent reading control is the same as that of the first document.

Figure 7:
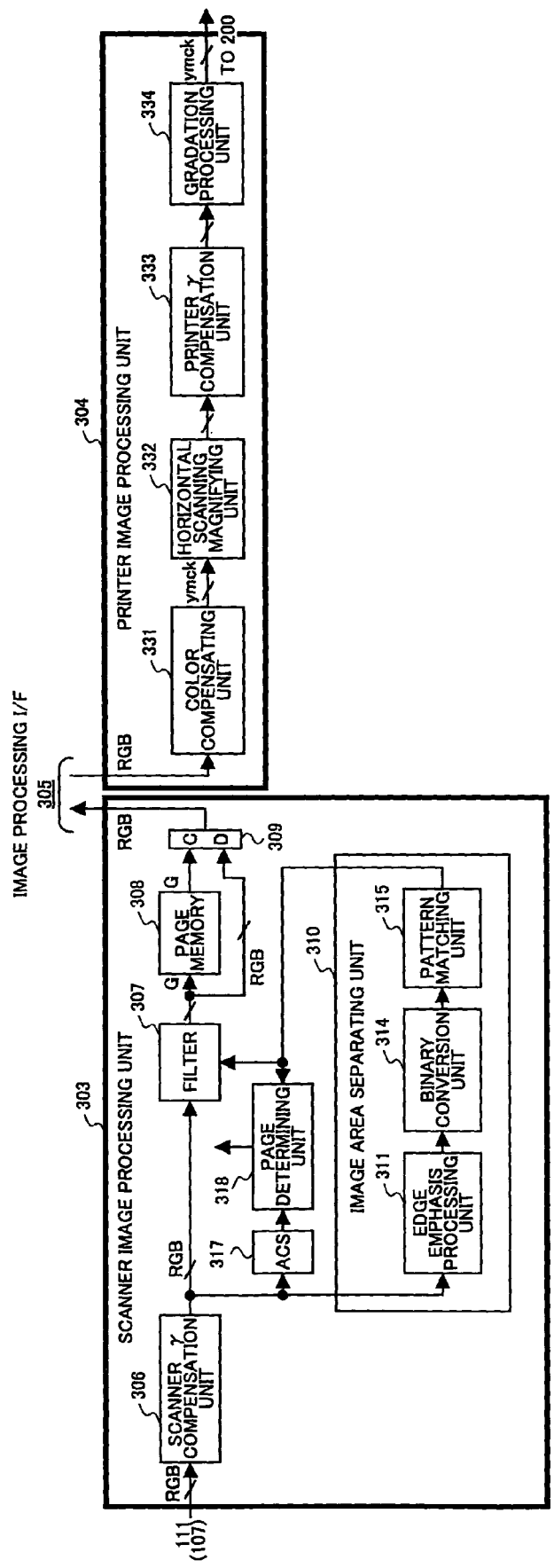
FIG. 7 is a block diagram showing the configuration of a scanner image processing unit 303, and a printer image processing unit 304 shown in FIG. 5.

FIG. 7 shows the configuration of the scanner image processing unit 303 and the printer image processing unit 304 that are shown in FIG. 5. The scanner image processing unit 303 includes a scanner γ compensation 306 for compensating for the RGB image data provided by the AFE 111 of the scanner 100, and a filter 307. The filter 307 is for performing an edge emphasis process on an edge area of the image, and for performing a smoothing process on a halftone area wherein concentration smoothly changes, according to an image area detection result carried out by an image area separating unit 310.

If monochrome reading or monochrome copying is directed by pressing a "Black (BK)" button (FIG. 8), the "Black (BK)" button is shaded, and only G image data, to which the edge emphasis/smoothing process is carried out by the filter 307, are written in a page memory 308. If a "Full color" button is pressed, the RGB image data, to which the edge emphasis/smoothing process is carried out by the filter 307, are stored in the memory 406 (FIG. 5). In the case wherein an "Automatic color selection" is directed, or no color selection is made (i.e., none of buttons "Black (BK)", "Full color", "Automatic color selection", "Blue (Cyan) (C)", "Red (Magenta) M)"}, and "Yellow (Y)" are selected), reading/printing color cannot be identified. In this case, the RGB image data that the filter 307 processes are stored in the memory 406, and the G image data are stored in the page memory 308.

The scanner image processing unit 303 further includes a data selector 309 for selectively outputting one of the G image data from the page memory 308 and the RGB image data that are filtered by the filter 307 as the read image data. Here, the image data output to the image processing I/F 305 from the page memory 308 of the scanner image processing unit 303 are treated as Bk image data of monochrome reading hereafter.

The image area separating unit 310 has an edge emphasis processing unit 311 for carrying out an edge emphasis process on the G image data that are processed by the scanner γ compensation 306 for correcting read distortion. The edge emphasis process includes making each pixel of image data of a G image data sequence into a target pixel, defining a pixel matrix, e.g., a matrix of 3×3 with the target pixel being at the center, multiplying image data of each pixel of the pixel matrix by a corresponding edge emphasis coefficient, pixel by pixel, to obtain products, totaling the products, and making the total of the products into an edge detection value of the target pixel. The edge detection value expresses the visibility (sharpness) of the edge.

The edge detection value is converted into a binary value (H: image edge candidate, and L: non-edge) by a binary conversion unit 314. Then, a pattern matching unit 315 determines whether the target pixel is at an edge position (edge pixel). That is, it is determined whether the area that is centered by the target pixel is a binary image, such as a character and a line drawing, or a halftone image, such as a photograph. In other words, the pattern matching unit 315 determines that the target pixel is in the image edge area (character area) if the distribution of the binary values obtained by the binary conversion unit 314 for the area (3×3-pixel matrix) matches a predetermined edge pattern.

A result of the determination of the pattern matching unit 315, i.e., whether an image edge (typically, a character) or non-edge (typically, a photograph), is provided to the filter 307. Then, the filter 307 performs an edge emphasis process on the image data that are scanner γ compensated for if the determination result is an image edge, and performs the smoothing process if the determination result is non-edge.

An ACS (Automatic Color Selector) 317 detects whether the image data of the document express a monochrome image, or a color image, and generates a monochrome-or-color signal. The monochrome-or-color signal of the ACS 317, and the determination of whether image or non-edge by the pattern matching unit 315 of the image area separating unit 310 are provided to a page determining unit 318. The page determining unit 318 determines whether the document is of monochrome or color, and whether it is a character document or a photograph document. Specifically, while reading the document, the page determining unit 318 counts the first number of pixels that are determined to be color pixels, and the second number of pixels that are determined to be image edges; if the first number is greater than a predetermined value, the document is determined to be of color, otherwise monochrome; and if the second number is greater than a predetermined value, the document is determined to be of a binary image (typically, characters), otherwise a non-edge image (typically, a photograph). The CPU 301 refers to a result (whether monochrome or color, and whether characters or a photograph) of the page determining unit 318 when a page of the document has been read.

The printer image processing unit 304 includes a color compensating unit 331 for converting RGB image data into ymc (recording color) image data, and for outputting the ymc image data to a horizontal scanning magnifying unit 332. The horizontal scanning magnifying unit 332 magnifies/shrinks the ymc image data as required. Then, a printer γ compensating unit 333 performs γ compensation for the imaging property of the printer 200. Then a gradation processing unit 334 converts the image data into image data that express concentration gradation using a matrix distribution recording/not-recording each pixel, and then the image data are provided to the printer 200. If the image data are of monochrome, the image data are provided to the horizontal scanning magnifying unit 332 rather than the color compensating unit 331. That is, the color conversion process is not performed.

Figure 8:
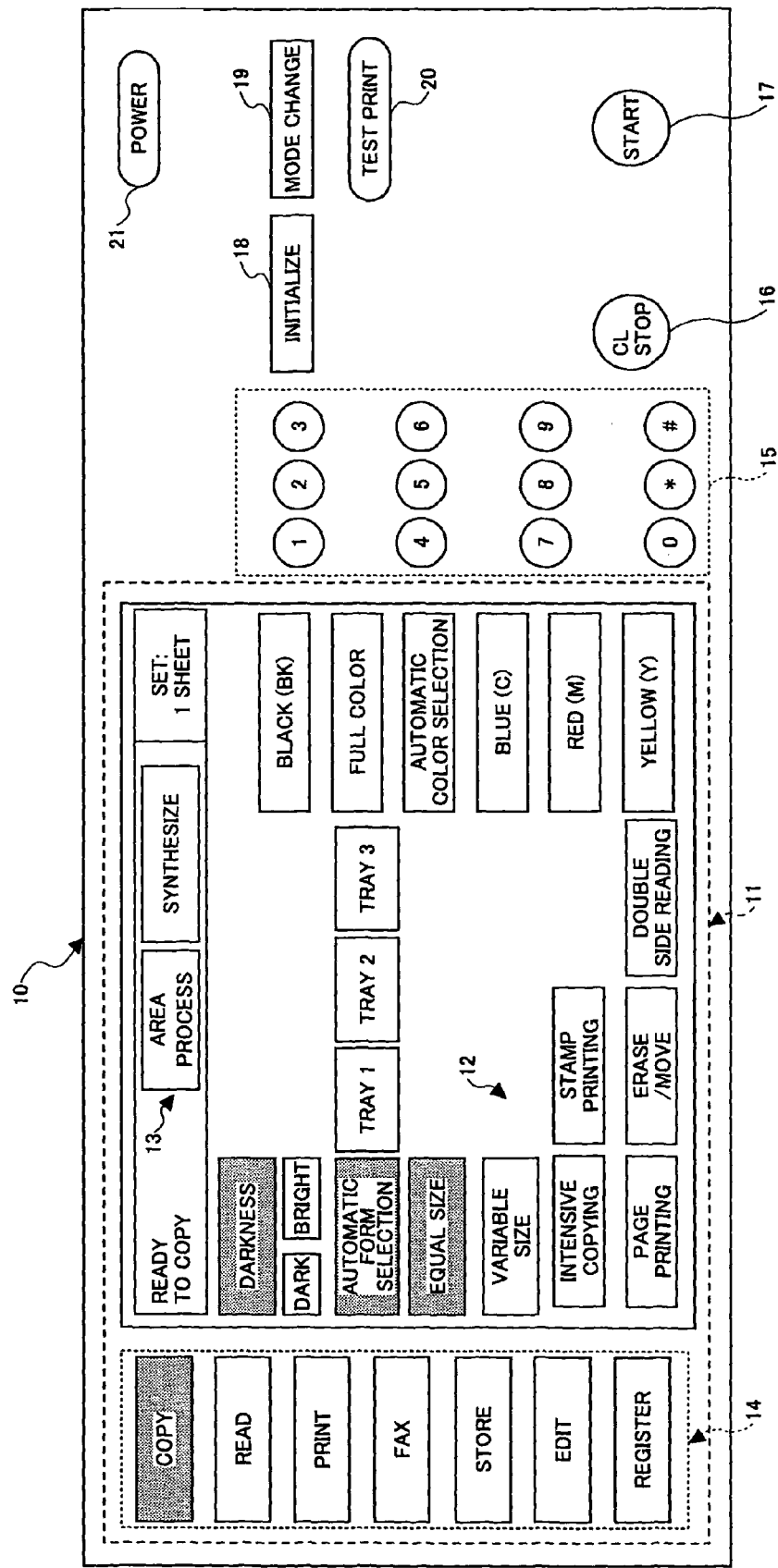
FIG. 8 is a layout drawing showing a part of the upper surface of an operations board 10 of the multifunctional machine MF1 shown in FIG. 1.

As shown in FIG. 8, the operations board 10 includes a liquid crystal touch panel 11, a ten key 15, a clear/stop key 16, a start key 17, an initial setting key 18, a mode switching key 19, a test printing key 20, and the power supply key 21. Further, although illustration is omitted, there is an alphabet keyboard for inputting URL, mail text, a file name, a folder name, a setup, short-cut registration, and the like on the left-hand side of the liquid crystal touch panel 11, some key tops of the keyboard bearing hiragana.

The power supply key 21 is for switching from energy-saving mode (pause mode or low power mode) to standby mode in which image printing is possible, and vice versa. If the power supply key 21 is pushed once while in the energy-saving mode, the mode is switched from energy-saving mode to standby mode. If the power supply key 21 is pushed once while in the standby mode, the mode is switched from standby mode to pause mode. The test printing key 20 is for printing only copy regardless of the number of copies that may be set up such that a printing result can be examined.

By pushing the initial setting key 18, the initial state of the machine can be customized as desired. For example, a state that is achieved when a reset key of a copying function is pushed is realized by setting up, for example, following items; waiting times (Td1, Td2) for shifting to energy-saving mode, an execution interval of output compensation (Td3), size of the recording medium that is loaded to the machine.

When the initial setting key 18 is operated, selection buttons are displayed, the selection buttons being for selecting "Initial value setup" function for specifying various initial values, "ID setup" function, "Copyright registration/setup" function, "Output of use record" function, and the like.

"Initial value setup" function includes setup of the waiting time Td1 from standby mode to low power mode, the waiting time Td2 from low power mode to pause mode, and the execution interval of output compensation Td3 for updating the characteristic of conversion from analog image signal into digital image data.

The liquid crystal touch panel 11 displays various function keys 14, messages showing various operating states of the engine 300, and the controller board 400. The function keys 14 include "Copy", "Scanner", "Print", "Facsimile", "Store", "Edit", "Registration", other functions to select, and operations being executed. An I/O screen corresponding to the selected function is displayed. For example, if the "Copy" function is selected, as shown in FIG. 8, the I/O screens displays function keys 12, and messages 13 wherein the number of copies, and the state of image formation apparatus are displayed. If a key displayed on the liquid crystal touch panel 11 is touched (operated), the operation board 10 reads the touch panel input, and displays the touched key with shadings (reverse video display) indicating that the key is being selected. Further, when the details of a function are specified (for example, kind of page printing), a pop-up setting screen of a detailed function is provided by touching a key. Since a dot matrix is used by the liquid crystal touch panel 11, graphical display can be provided as desired.

The function keys 12 include printing color specifying keys, namely, "Black (BK)", "Full color", "Automatic color selection", "Blue (Cyan) (C)", "Red (Magenta) (M)", and "Yellow (Y)".

Figure 9:
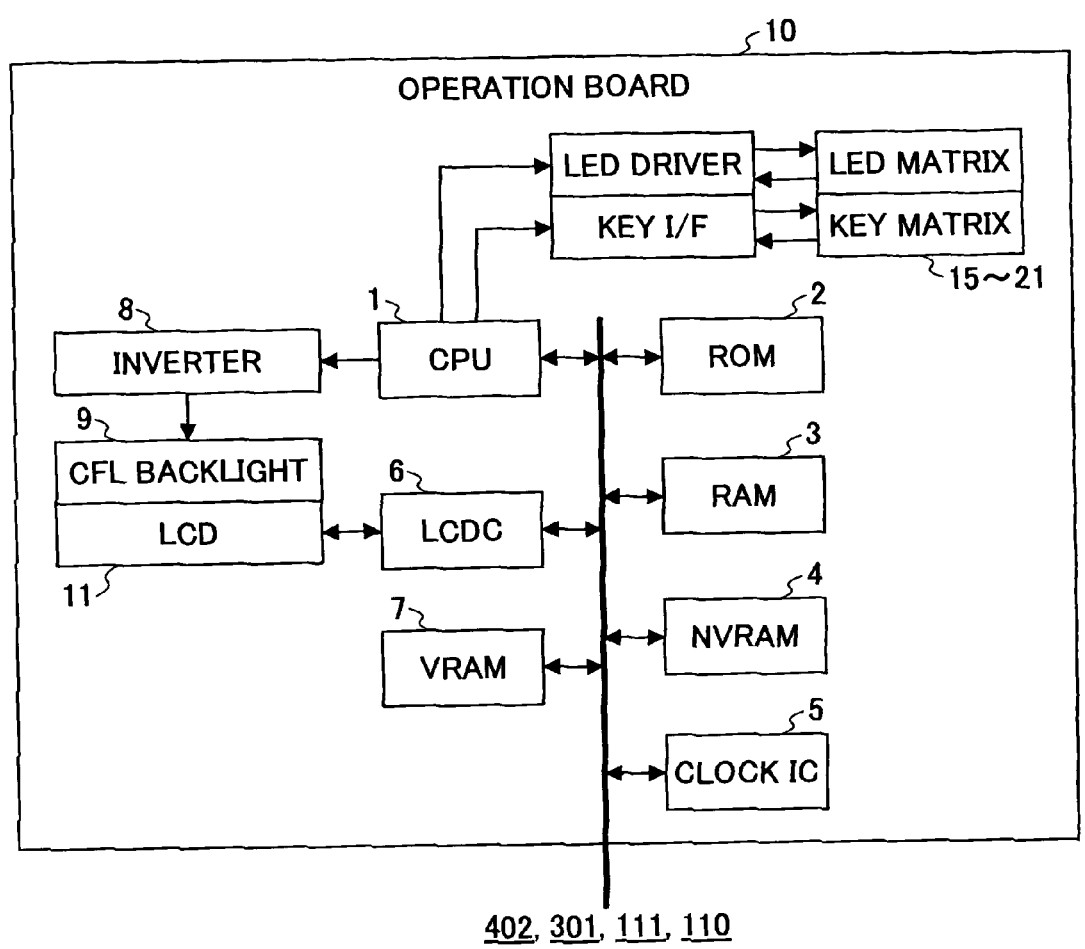
FIG. 9 is a block diagram of an electronic system of the operations board 10.

FIG. 9 is a block diagram of the circuit of the operations board 10. The operation board 10 includes a CPU 1 that communicates with the CPU 402 of the controller board 400 for reading an input to the operations board 10, controlling the display of the operations board 10, and the like. Further, the operations board 10 includes a ROM 2 for storing a control program of the CPU 1, a RAM 3 for temporarily storing data for control, a VRAM 7 for storing drawing data for the liquid crystal touch panel 11, a liquid crystal display controller (LCDC) 6 that is connected to the VRAM 7 for drawing timing control and touch input detection of the liquid crystal touch panel 11, and a clock IC 5 for generating time data. The LCDC 6 is connected to the liquid crystal touch panel 11, which has a light source of CFL serving as a backlight 9. The CPU 1 is connected to an inverter 8 for driving the CFL back light 9, a key matrix of the operation keys 15 through 21 (operation key group), a light emitting diode matrix comprising light emitting diodes for display, a light emitting diode driver for driving the light emitting diodes. Further, the CPU 1 is connected to a data bus, to which a non-volatile RAM (NVRAM) 4 for image processing mode storage is connected.

The CPU 1 of the operation board 10 performs usual control of the copying machine of reading operations, and display outputting, corresponding to user operations of the operation board 10, such as reading the number key operations, generating input numeric data, reading the start key operations, transferring the starting direction to the controller board 400, and reading an input for changing size of the recording medium.

Figure 10:
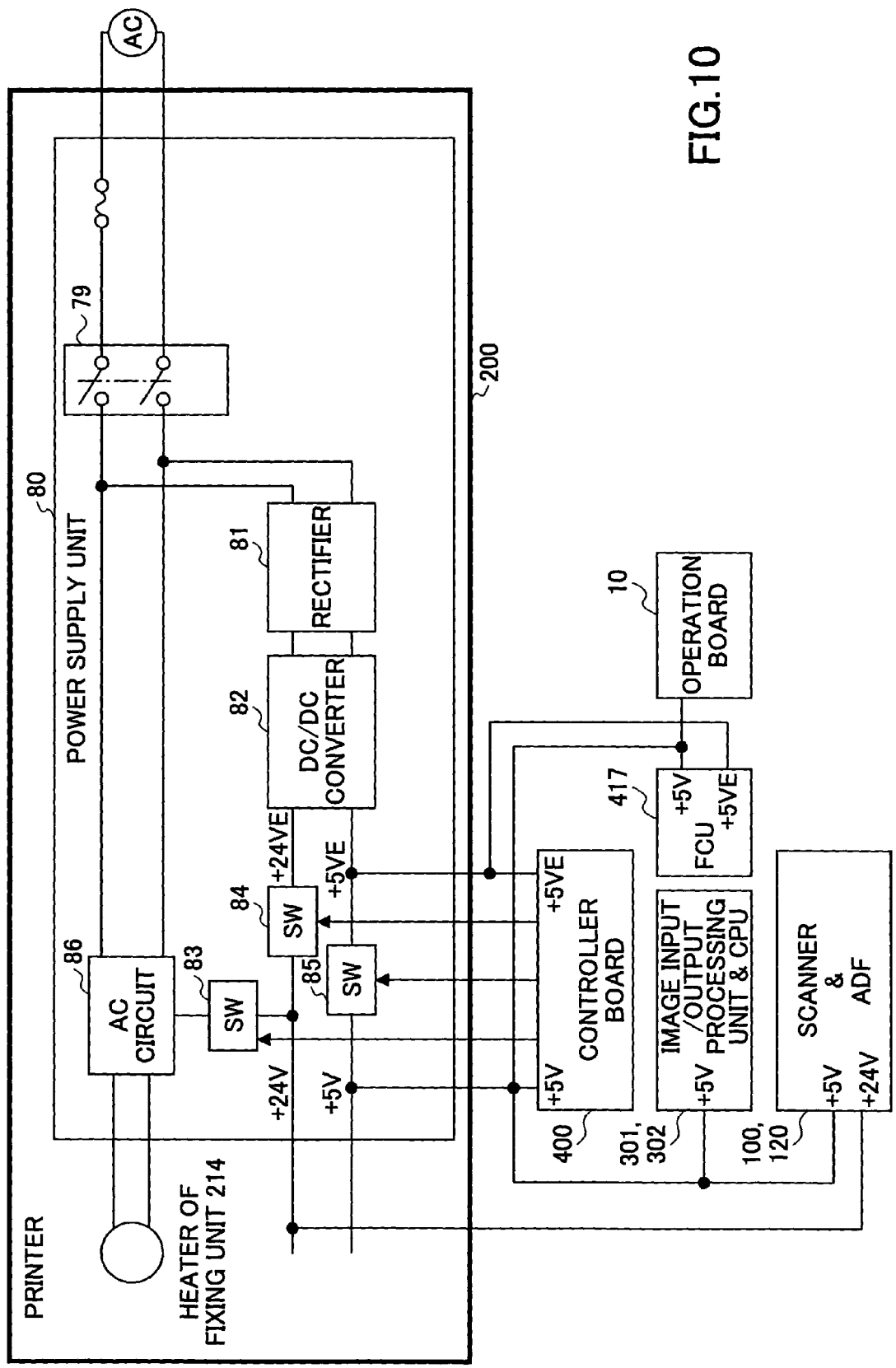
FIG. 10 is a block diagram showing the configuration of a power supply unit 80 for supplying electric power to the multifunctional machine MF1 shown in FIG. 1.

FIG. 10 shows the outline of a power feeding system for providing operating voltages to various parts of the multi-functional machine MF1 that is shown in FIG. 1 and FIG. 5. If a main power switch 79 is closed, commercial alternating current 100 V is provided to a rectifier 81 for rectifying and smoothing, and to an AC circuit 86 of the power supply unit 80. The rectifier 81 provides a direct-current output to a DC/DC converter 82. In this example, the DC/DC converter 82 generates two direct current voltages, namely, stabilized +24 V/+24 VE, and +5 V/+5 VE.

In the power supply unit 80, switches 84 and 85 are connected to the converter outputs +24 VE (voltage of +24 V) and +5 VE (voltage of +5 V), respectively. The AC circuit 86 that is connected to a fixing heater 87 of a fixing apparatus has a power supply relay that is closed (turned on) by +24 V provided through a switch 83. When the power supply relay is closed, the commercial alternating current AC is provided to an alternating current supply circuit of the AC circuit 86 for supplying power to the fixing heater 87. The alternating current supply circuit is of a phase control that uses a triac (phase control switching element), and controls the phase of the current through the triac so that fixing temperature is controlled to a target temperature with reference to a temperature detection signal of a fixing temperature sensor that is not illustrated.

The controller board 400 provides a control signal for turning on/off the switches 83, 84, and 85. In the "standby mode" (waiting mode and normal mode), the controller board 400 turns on the switches 83, 84, and 85 by a control signal. In the "standby mode", the temperature of the fixing roller is maintained at a fixing operating temperature set by the fixing process of fixing a toner image on a recording medium such that image formation can be immediately started in response to a copy start command or a print start command.

In the "low power mode" (waiting mode), the controller board 400 turns off the switch 83, thereby disconnecting the voltage +24 V from the power supply relay of the AC circuit 86 that provides power to the fixing heater 87 of the fixing apparatus. That is, the power supply to the AC circuit 86 is interrupted. In the "low power mode", operations of the scanner 100 and the ADF 120 are enabled such that image reading is available for storing in the HDD 401, for facsimile transmission, and for providing the image to a personal computer PC; accordingly, the switch 84 for supplying +24 V, and the switch 85 for supplying +5 V are kept on.

In the "pause mode", the controller board 400 turns off the switch 84 for supplying +24 V, and the switch 85 for supplying +5 V. That is, all the switches 83 through 85 are turned off.

Although the switches 83 through 85 are turned off in the pause mode, a detection voltage +5 VE is provided to each detection signal line of the pressurization plate switch 112, the filler sensor 130, and the power supply key switch 21 of the operation boards 10 by the state change detection unit ACD of the controller board 400. Further, +5 VE is kept on to an electrical circuit for detecting a print command of the personal computer PC, and a facsimile reception detecting circuit of the facsimile control unit FCU.

The following Table 1 shows ON/OFF states of the switches 83 through 85 corresponding to each mode. Further, in the following Table 2, information processing items that are available in each mode are shown. In Table 2, "Tx & Rx" represents a facsimile transmission and reception without printing-out of the FCU, and "Data Holding" represents holding stored image data of the memory 406.

TABLE 1

| | | SWITCH SETTING | | |
|---|---|---|---|---|
| | | SW 83 | SW 84 | SW 85 |
| MODE | STANDBY | ON | ON | ON |
| | LOW POWER | OFF | ON | ON |
| | PAUSE | OFF | OFF | OFF |

TABLE 2

| | | AVAILABILITY OF FUNCTIONS | | | | | |
|---|---|---|---|---|---|---|---|
| | | INPUT DETECTION | IMAGE READING | COPYING | PRINTING | TX & RX | DATA HOLDING |
| MODE | STANDBY | YES | YES | YES | YES | YES | YES |
| | LOW POWER | YES | YES | NO | NO | YES | YES |
| | PAUSE | YES | NO | NO | NO | YES | YES |

Figure 11:
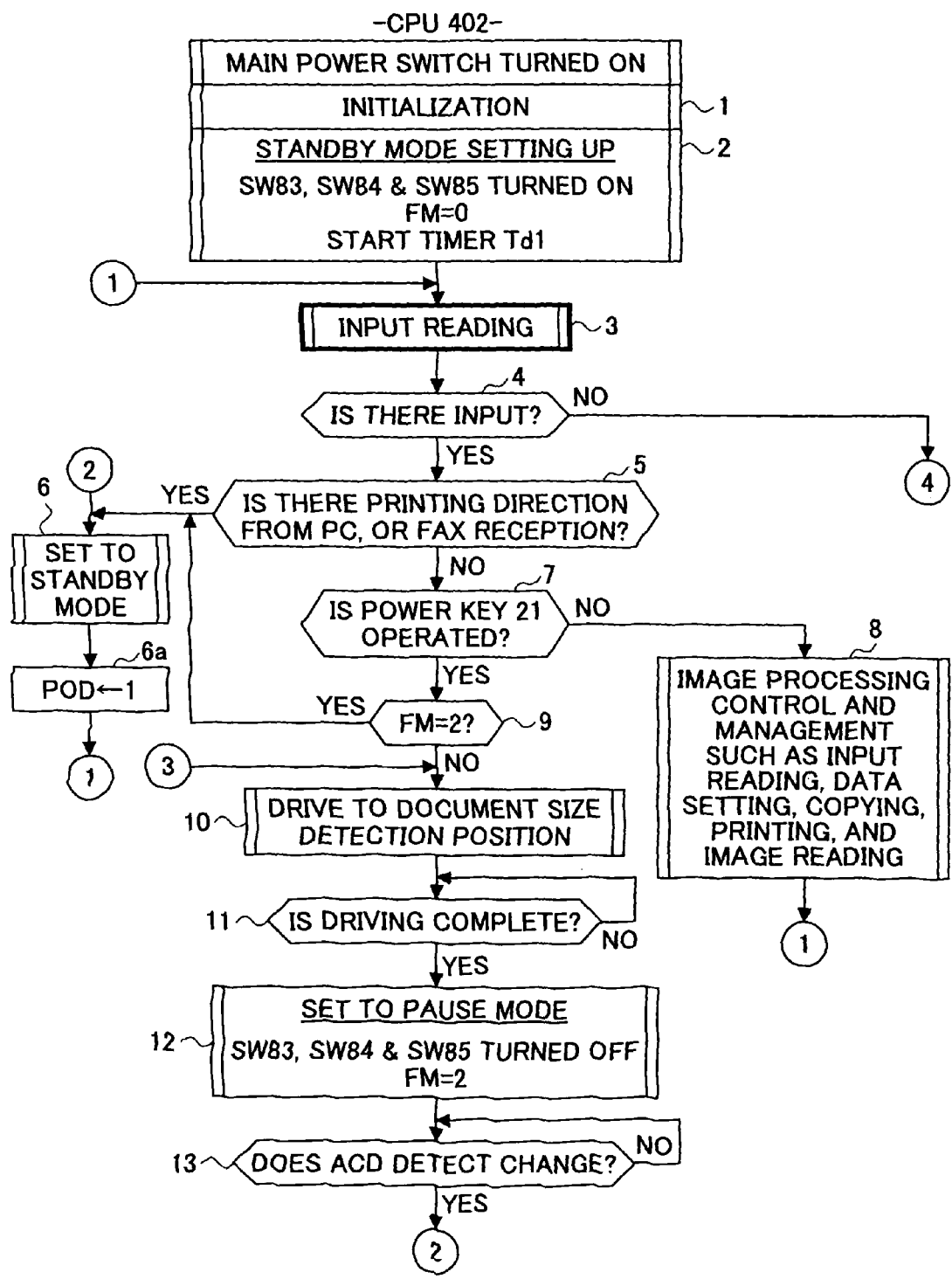
FIG. 11 is a flowchart showing a part of control flow, mainly energy-saving control, performed by CPU 402 shown in FIG. 5.
Figure 12:
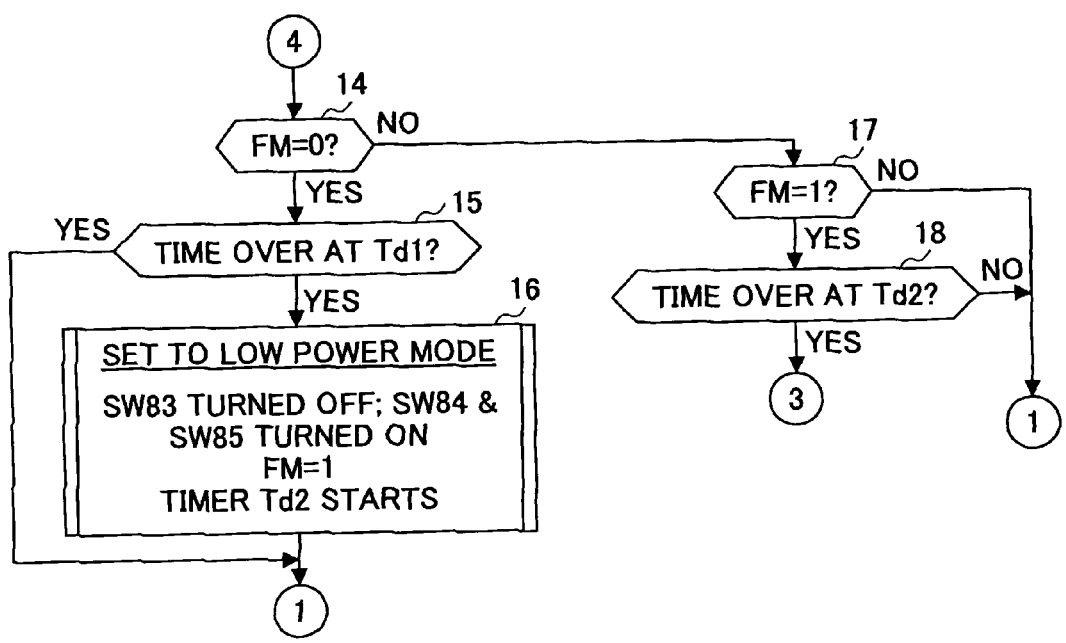
FIG. 12 is a flowchart showing the remainder of the control flow of FIG. 11.

FIG. 11 and FIG. 12 are flowcharts showing switching control between standby mode, low power mode, and pause mode carried out by the controller board 400 (CPU 402). First, with reference to FIG. 11, when the power switch 79 is closed (turned on), commercial AC power is provided to the power supply unit 80 (FIG. 10), and the power supply unit 80 provides the operating voltages. Then, CPU 402 of the controller board 400 carries out an initialization process (step 1) in response to the power supply being turned on. Then, a "standby mode setting up" (step 2) is performed. That is, the switches 83 through 85 are turned on. Further, data of an energy-saving mode register FM is made into "0" that indicates the standby mode, and a timer TD1 is started, the timer TD1 monitoring lapse time until the waiting time Td1 when switching from standby mode to low power mode takes place.

Below, step numbers are expressed in a parenthesis without the word "step".

In the standby mode, the operating voltages are supplied to each part of the multifunctional machine MF1. The CPU 1 of the operations board 10, in response to the supplied operating voltages according to the "standby mode setting up" (2), performs power supply ON initialization, reads the copying conditions of the standard processing mode stored in the NVRAM 4, and displays the copying conditions on the liquid crystal touch panel 11. Operations of the scanner 100 are described below with reference to FIG. 13 and FIG. 14.

At input reading (3) of FIG. 11, the CPU 1 of the operations board 10 reads an operation of the operations board 10 by the user, and notifies the CPU 402 of the user operation. Further, the CPU 402, which is included in the controller board 400, decodes a command from the personal computer PC and FCU. Corresponding to the user operation of the operation boards 10, such as reading input from the function keys 14, and switching of the display of the liquid crystal panel 11, the CPU 1 of the operations board 10 controls operation reading and display output as the usual copying machine such as reading depression of the number key, generating input numeric data, reading depression of the start key, transferring the start direction to the controller board 400, and changing the size of the recording medium.

The waiting time Td1 for switching from standby mode to low power mode, and the waiting time Td2 for switching from low power mode to pause mode can be input from the operation board 10, and the input values are stored (registration) in the NVRAM 4 shown in FIG. 9. When the CPU 1 reads the user operation of the initial setting key 18 among the operation keys 15 through 21 at "input reading" (3), the setting menu screen is displayed on the liquid crystal touch panel 11. If the user selects "time setting" in the setting menu screen, a setting screen 12p, as shown in FIG. 15, appears for setting the waiting time Td1 before shifting to low power mode, the waiting time Td2 before shifting to pause mode, and "execution interval of output compensation" Td3.

Figure 15:
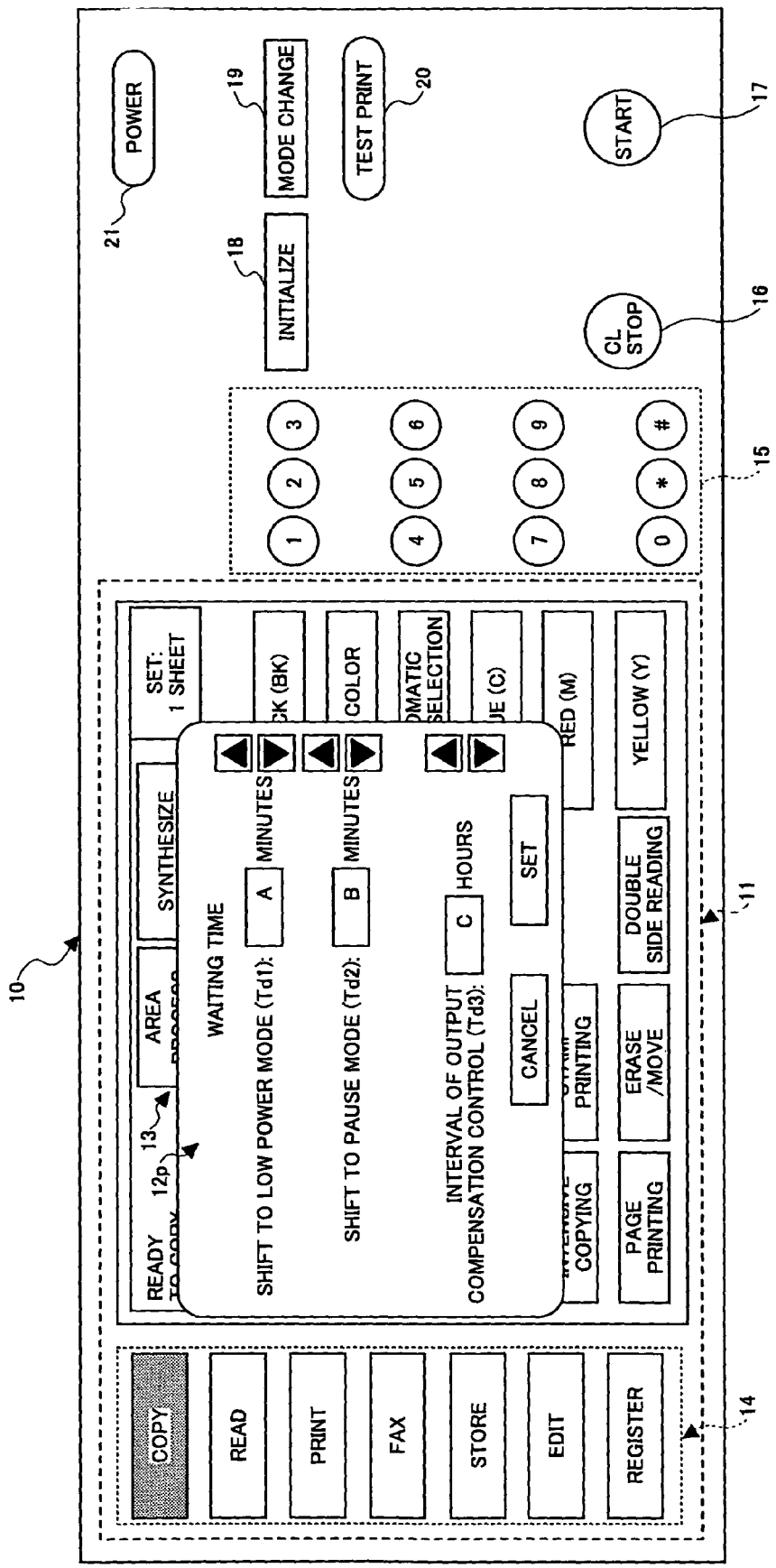
FIG. 15 is a layout drawing showing a part of the upper surface of the operations board 10 of the multifunctional machine MF1 shown in FIG. 1, wherein an input screen 12p pops up when initial setup 18 is selected on a liquid crystal panel 11.

With reference to FIG. 15, the user can set up the waiting time Td1 (A) for shifting from standby mode to low power mode, the waiting time Td2 (B) for shifting from low power mode to pause mode, and the execution interval of output compensation Td3 (C) of AGC (adjustment of gain, etc.) by clicking corresponding up/down buttons on the setting screen 12p. When a "setup" button is operated, values of Td1 (A), Td2 (B), and Td3 (C) are stored in the NVRAM 4 overwriting previous values. Further, the values of Td1 (A) and Td2 (B) are provided to the CPU 402 of the controller board 400 such that the values of Td1 (A) and Td2 (B) stored in an internal RAM of the CPU 402 are updated. The values of Td1 (A) and Td2 (B) are referred to at steps 2 and 10. Further, the setup data table addressed to the AFE 111 held by the HDD 401 is updated with the value of Td3 (C).

Afterward, the waiting time values Td1 and Td2 stored in the NVRAM 4 are provided to the CPU 402 when the CPU 1 of the operations board 10 reads the copying conditions of the standard processing mode stored in the NVRAM 4 at the initialization step in response to the power supply being turned on and displays the standard processing mode on the liquid crystal touch panel 11. The CPU 402 holds the waiting time values Td1 and Td2 in its internal RAM, and sets them to the timers Td1 and Td2, respectively, as time limit values at steps 2, 7, 9, and 11.

At "input reading" (3) shown in FIG. 11, if a printing direction is received from the personal computer PC, or if the FCU 417 reports facsimile reception (5), the CPU 402 switches the power supply unit 80 to the standby mode if it is in one of pause mode and low power mode (6). Then, the state detection circuit ACD is latched (6a). Thereby, the power-on mode signal POD is set to "1".

At "input reading" (3), if a direction is input, for example, a user operation of the operations board 10 (such as touching the image processing mode specification key 14, pressing the number keys, pressing the start key, and changing the paper size), the direction is received by the CPU 402 of the controller board 400, and a process corresponding to the direction is carried out (5-7-8).

At "input reading" (3) in FIG. 11, when the power supply key 21 is turned on (depressed) during the standby mode, the CPU 1 of the operations board 10 and the CPU 402 of the controller board 400 determine that the user directs switching to the pause mode (7 and 9), direct the CPU of the reading unit 110 to drive the reading unit 110 to the document size reading position (10), the CPU of the reading unit 110 reports the completion of the drive to the document size reading position (11), updates the previous image processing mode in the NVRAM 4 by the image processing mode displayed on the liquid crystal touch panel 11, and shifts to the pause mode (12). During the pause mode, the CPU 402 waits for the mode change detection unit ACD to generate a change detected signal (13). When the mode change detection signal is generated, the power supply unit 80 is shifted to the standby mode (6). In addition, if a printing command is issued from the PC while waiting for generation of the switch detected signal, the power supply unit 80 is shifted to the standby mode (6).

When the power supply key 21 is turned on (depressed) during the low power mode or pause mode, the CPU 402 determines that the user directs shifting to the standby mode, sets up the standby mode, reads the previous image processing mode stored in the NVRAM 4, and displays the previous image processing mode on the liquid crystal touch panel 11 (7, 9, and 6).

Next, FIG. 12 is referred to. If there is no input at "input reading" (3) in FIG. 11, while waiting for an input, duration of waiting is determined by the timer TD1 (4 of FIG. 11; 14 and 15 of FIG. 12). If there are no inputs and the duration becomes equal to or greater than the waiting time Td1 (time over), the CPU 402 of the controller board 400 shifts the mode to the low power mode (16). That is, the switch 83 is turned off, the switches 84 and 85 are kept on, "1" is provided to the energy-saving mode register FM indicating that it is in the low power mode, and a timer TD2 for measuring time lapse up to the waiting time Td2 is started. If there are no inputs and the waiting time Td2 is reached at the timer TD2 (17 and 18), the CPU 402 shifts the mode to the pause mode (10 through 12 of FIG. 11).

Figure 13:
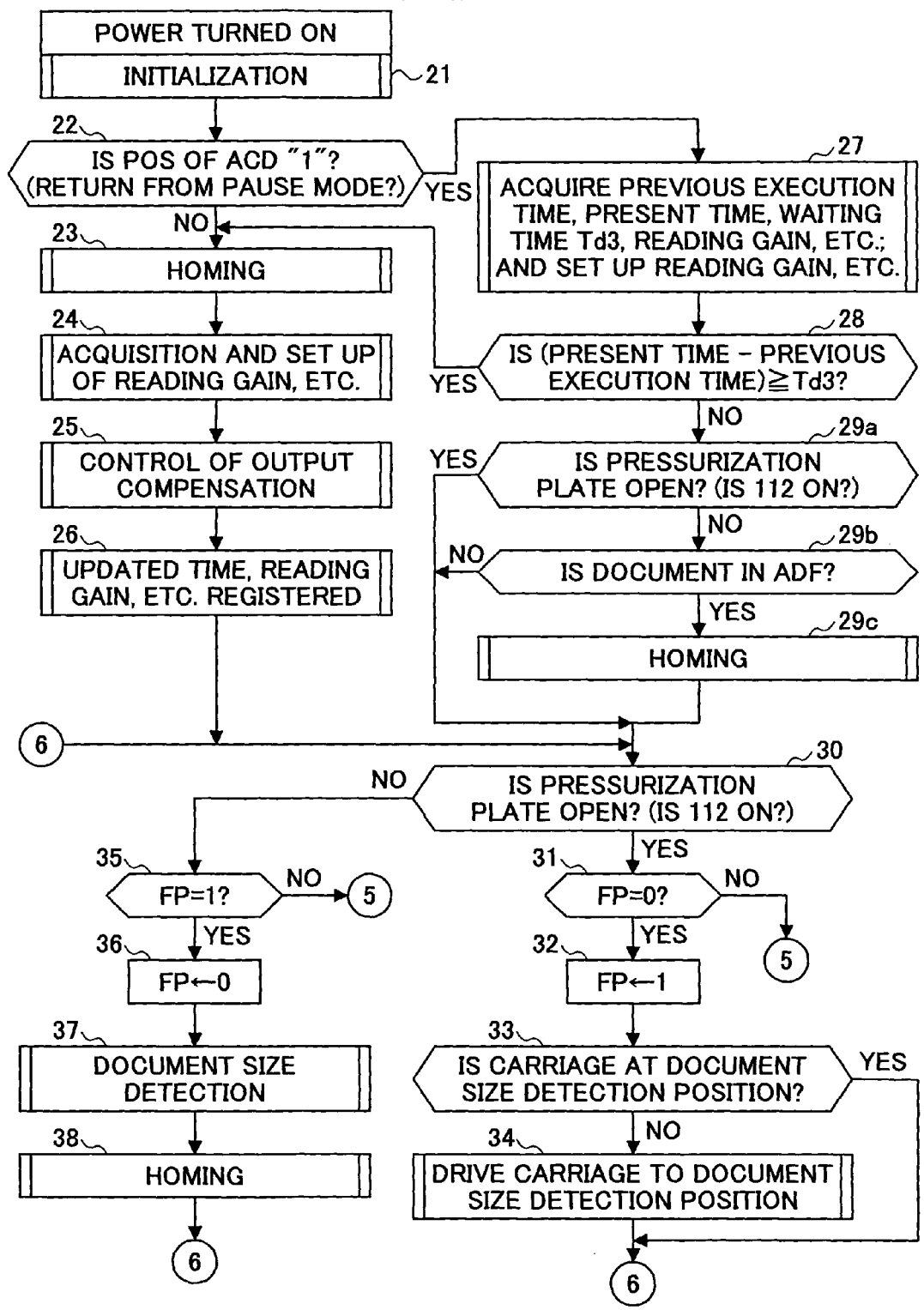
FIG. 13 is a flowchart showing a part of the control flow, mainly control of document size detection, homing, and image output compensation by the reading unit 110 and the AFE 111 shown in FIG. 5.
Figure 14:
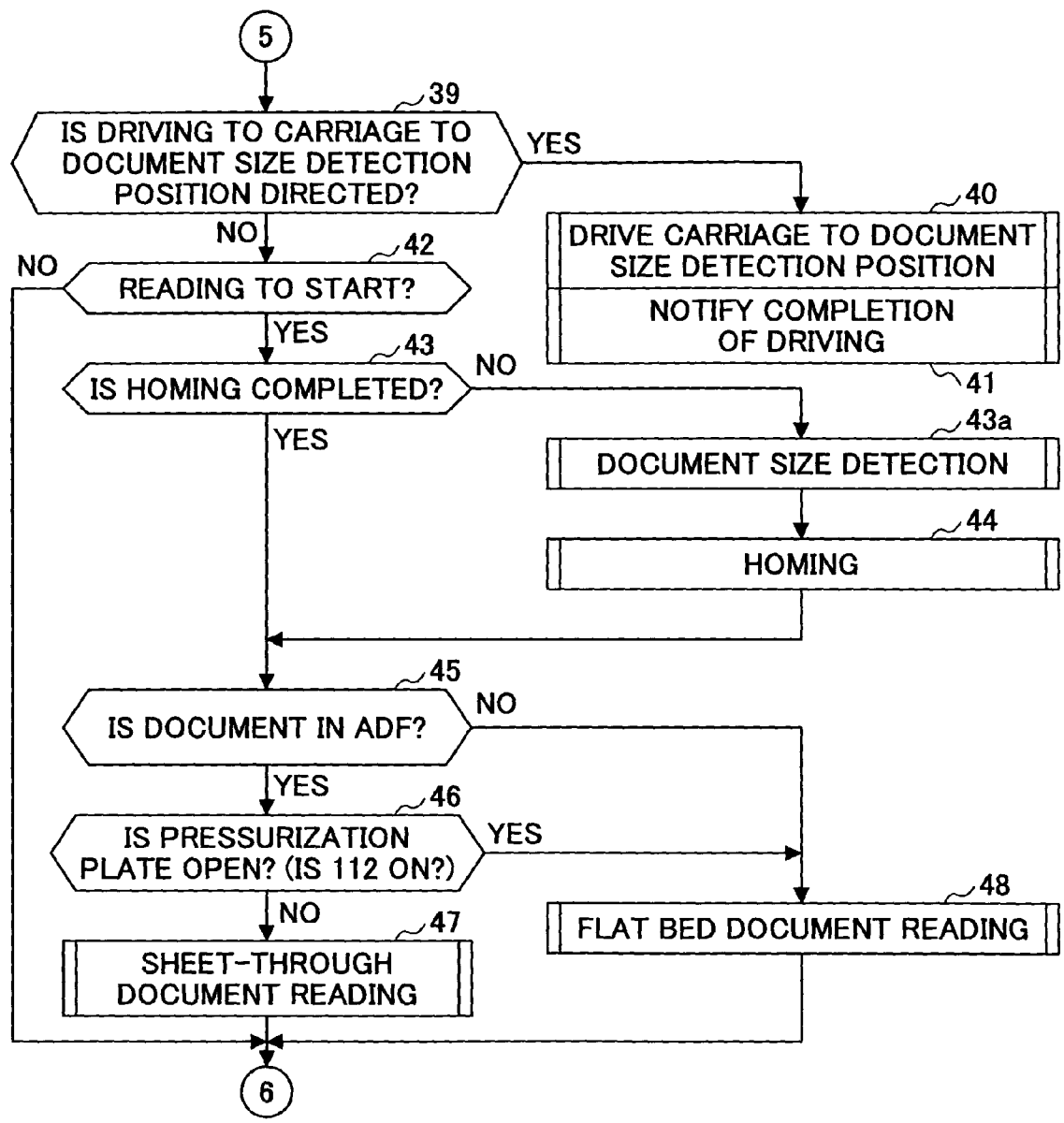
FIG. 14 is a flowchart showing the remainder of the control flow continuation of FIG. 13.

FIG. 13 and FIG. 14 are flowcharts showing steps of detection of the document size, homing, and control (updating) of image output compensation that are performed jointly by the CPU 301 of the engine 300, the CPU of the reading unit 110, and the CPU 42 of the AFE 111. When the power is supplied to the scanner 100 and the ADF 120, the CPU of the reading unit 110 of the scanner 100 performs "power supply ON initialization" (21) in response to the operating voltage +5V being applied. Then, the reading unit 110 refers to the power-on mode signal POD of the state change detection unit ACD (22).

If the power-on mode signal POD is "0" that indicates that the operating voltage is provided to the scanner 100 from the turn-off state of the main power switch, the CPU of the reading unit 110 performs "homing" (23). At the "homing" step (23), the first carriage carrying the luminous source 102 and the first mirror 103 is driven in the returning direction (to the left in FIG. 2), and when the reference point sensor 109 detects the first carriage, the reference point position data that expresses "A" (refer to FIG. 2) is set to a vertical scanning position register assigned to the internal memory of the CPU of the reading unit 110. In a homing register, "1" is stored, which "1" indicates that homing is completed. That is, information that homing is complete is set. Then, the first carriage is further driven in the returning direction. During this return drive, the driving pulses of the stepping motor for driving the first carriage are counted down from the reference point position data, the position data of the vertical scanning position register are updated by the current position data, and when the position data of the vertical scanning position register become equal to the home position HP that represents a vertical scanning drive reference point in the case of the flat bed document reading, the return drive of the first carriage is stopped. Here, in the case that a limit switch (not illustrated) provided on the left of the home position HP is turned on by the first carriage without the reference point sensor 109 detecting the first carriage after starting the return drive of the first carriage, the CPU of the reading unit 110 stops the stepping motor for driving the first carriage, starts driving in the direction of vertical scanning (to the right), and when the reference point sensor 109 detects the first carriage, the reference point position data that expresses "A" (refer to FIG. 2) is set to the vertical scanning position register. Then, the first carriage is driven further rightward, the driving pulses of the stepping motor for driving the first carriage are counted up from the reference point position data, the reference point position data of the vertical scanning position register are updated by the current position, and if the reference point position data become equal to the document size detection position (A+B+C), the drive in the direction of vertical scanning of the first carriage is stopped. Further, the first carriage is driven in the returning direction (to the left); and when the reference point sensor 109 detects the first carriage, the reference point position data that expresses A (refer to FIG. 2) is set to the vertical scanning position register. In the homing register, "1" is written for indicating that the first carriage is settled at the homing position. That is, the information indicating that homing is completed is set. The first carriage is further driven in the returning direction, and if the position data of the vertical scanning position register becomes equal to the home position HP that is the vertical scanning drive reference point in flat bed document reading, the drive of the first carriage is stopped.

When the "homing" step (23) is completed, the CPU of the reading unit 110 performs "acquisition and setup of reading gain, etc." (24).

At the step of "acquisition and setup of reading gain, etc." (24), the CPU 42 of the AFE 111 reads the setup values, such as adjustment gain, stored in the setup data table of the HDD 401 of the controller board 400, the setup data table being addressed to the AFE 111, and stores the setup values in the RAM 43*b*, and sets up the latch (register) with the setup values, the latch (register) being of the D/A converter 37 of each of the image output compensation units 113 through 118. That is, the CPU 42 provides the setup value Srefd for Vrefd stored in the HDD 401, which is a non-volatile memory, to the D/A converter 37, and the D/A converter 37 provides the voltage Vrefd to the A/D conversion circuit 34 as the upper reference voltage through the selector 38. Further, the setup values Svg and Srefb for Vg and Vrefb, respectively, are provided to the D/A converter 37.

Next, the CPU 42 performs step of "control of output compensation" (25). The contents of the step 25 are as described in "AGC (adjustment of gain, etc.)" above. The setup data table that is addressed to the AFE 111, and stored in the HDD 401, are updated by the setup values that are updated by "AGC (adjustment of gain, etc.)" with the present time. Then, the first carriage is returned to the home position HP (26).

When the initialization (21) is performed in response to the operating voltage of 5V being applied, if the power-on mode signal POD is "1" indicating that the power supply is turned on because of shift to the waiting mode from the pause mode (energy-saving return), the CPU of the AFE 111 acquires the present time from the clock IC 5 of the operation board 10, acquires the execution interval of output compensation Td3 (C), the setup values, such as the gain, and the previous "present" time from the setup data table addressed to the AFE 111, the setup data table being held by the HDD 401, and stores the acquired data in the RAM 43*b* and in the latch of the D/A converter 37 of each image output compensation unit. That is, the setup value Srefd for Vrefd is provided to the D/A converter 37, and the D/A conversion output voltage Vrefd is provided to the A/D conversion circuit 34 as the upper reference voltage through the selector 38. Further, the setup value Svg and Srefb for Vg and Vrefb, respectively, are also provided to the D/A converter 37 (27). Next, the CPU 42 refers to the previous execution time, the present time, and the execution interval of output compensation Td3; and if the elapsed time from the previous execution time to the present time is greater than Td3, the CPU 42 performs the steps of "homing" (23), "acquisition and setup of reading gain, etc." (24), "control of output compensation" (25), and "registering updated reading gain, etc., and present time" (26).

In the case that the elapsed time from the previous execution time to the present time is less than Td3, if a document is loaded in the ADF 120 and the pressurization plate 137 is closed, it is likely that sheet-through reading is to be directed. Accordingly, "homing" (29c) is performed and the first carriage is positioned at the home position HP, operations of the "homing" (29c) being the same as "homing" (23). Otherwise, i.e., if the pressurization plate 137 is open, or if there is no document being loaded in the ADF 120, the step of "homing" (29c) is not performed, because it is likely that the pressurization plate will be closed (document size detection required), given that the first carriage having been driven to the document width detection position when the mode is previously shifted to the pause mode. That is, the first carriage is not moved.

Steps 30 and on are described. The CPU of the reading unit 110 monitors a change of the state of the pressurization plate switch 112 (30 through 32; and 30, and 35-36). When the pressurization plate 137 is opened (lift up) by greater than a predetermined angle, about 30°, with reference to the contact glass 101, a pressurization plate open/close register FP is updated from "0" to "1" (30-31-32). Then, if the first carriage is not in the document width detection position, it is driven to the document width detection position (33, and 34).

When the opening of the pressurization plate 137 is less than the predetermined angle, the CPU of the reading unit 110 updates the value of the pressurization plate open/close register FP from "1" to "0" (30-35-36), and performs the step of "document size detection" (37).

At the step of "document size detection" (37), the luminous source 102 is turned on, the first carriage is driven to the home position HP in the returning direction (to the left in FIG. 2), document size detection is directed to the document size detecting unit 48 through the CPU 42 of the AFE 111, the document size detecting unit 48 detects the size of the document on the contact glass 101 based on the image signal read by the CCD 107, the document size detecting unit 48 outputs a document size code to the CPU 42, and the document size code is provided by the CPU 42 to the CPU 301, the CPU 402, and the operations board 10.

Next, the CPU of the reading unit 110 performs the step of "homing" (38) that is the same as the step of "homing" (23).

For example, when a document is placed on the contact glass 101 and the ADF 120 is brought down on the contact glass 101, document size is detected by a sequence of the steps 30-35-36-37-38 of FIG. 13, and the first carriage is driven to the home position HP that is the starting point of a vertical scanning drive for reading the document. When a direction to start copying is issued, flat bed reading (42-43-45-48 of FIG. 14) is performed.

While there is no change in the open/close state of the pressurization plate 137, at steps 39 and 42 of FIG. 14, the CPU of the reading unit 110 waits for the CPU 402 to provide one of directions to drive to the document width reading position and to start reading the document after one of sequences of the steps 30-35 and the steps 30-31 of FIG. 13. As described above, when shifting to the pause mode, the CPU 402 provides a driving direction to the reading unit 110 to move to the document width reading position (10 of FIG. 10). In response to this, if the first carriage is not at the document width reading position, the reading unit 110 drives the first carriage to the document width reading position, and reports the completion of the drive to the CPU 402 (41). Then, shifting to the pause mode (operating voltage interception to the scanner) is awaited. The CPU 402 switches the power supply unit 80 to the pause mode, when the report of the completion of the drive to the document width reading position is obtained (11 and 12 of FIG. 10).

When the CPU 301 directs the reading unit 110 to start reading the document, the CPU of the reading unit 110 refers to information of the homing register (43). If the homing register is "0" that indicates that homing is incomplete, a step of "document size detection" (43a) is performed. The "document size detection" (43a) is the same as the "document size detection" (37) of FIG. 13. When the "document size detection" (43a) is finished, "homing" (44) is performed. This "homing" (44) is the same as the step of "homing" (23) in FIG. 13. By performing the homing step, the information of the homing register is made into "1" that expresses that the homing is completed.

When homing is completed, the CPU of the reading unit 110 refers to the detection signal of the filler sensor 130 (45). If the detection signal indicates that there is a document on the ADF 120, a step of "sheet-through document reading" (47) is performed. Otherwise, if there is no document on the ADF 120, a step of "flat bed document reading" (48) is performed.

Figure 16:
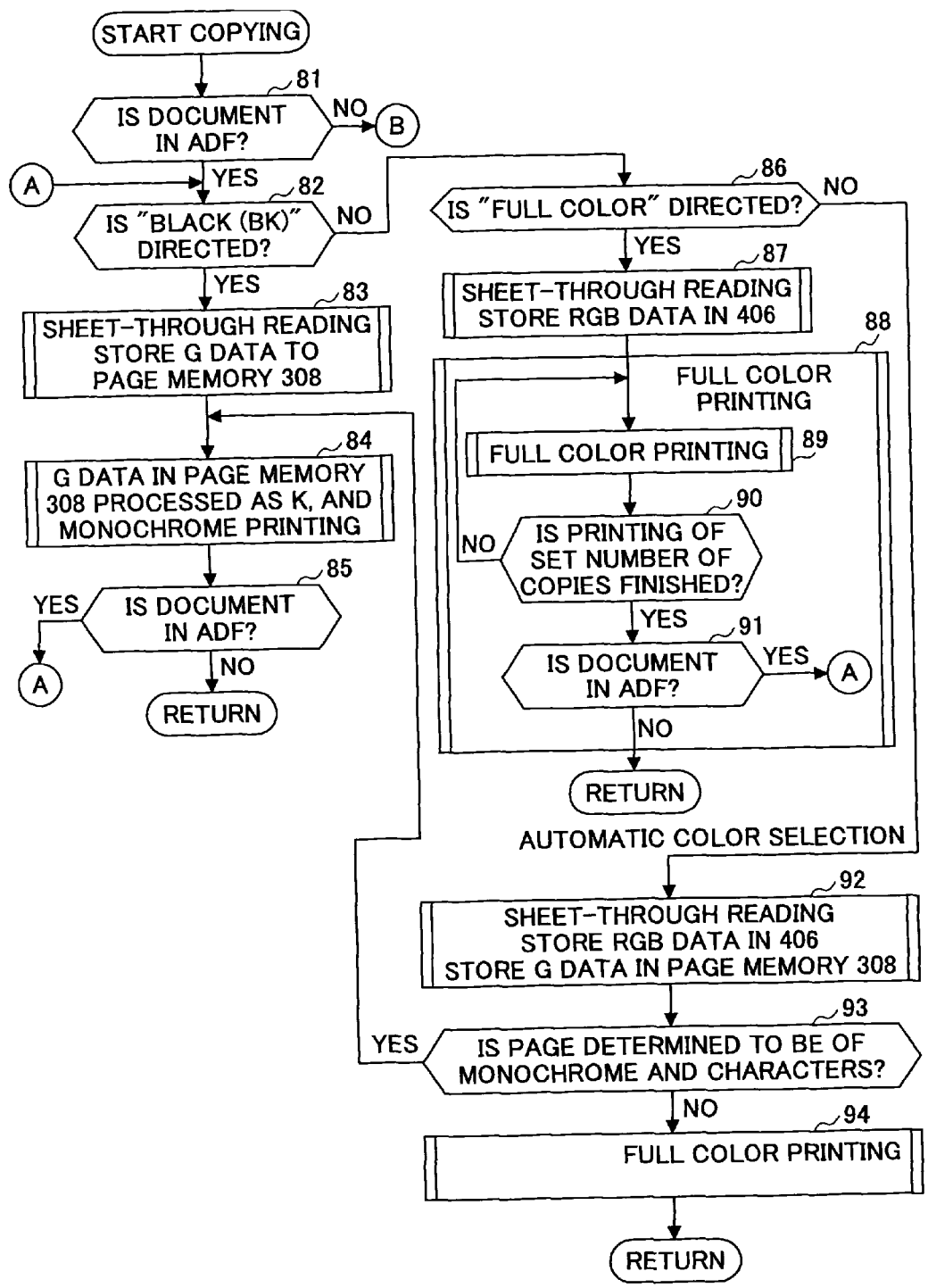
FIG. 16 is a flowchart showing a part of copy control performed by CPU 301 in response to a position detection command from CPU 402 in step 33 of FIG. 13.
Figure 17:
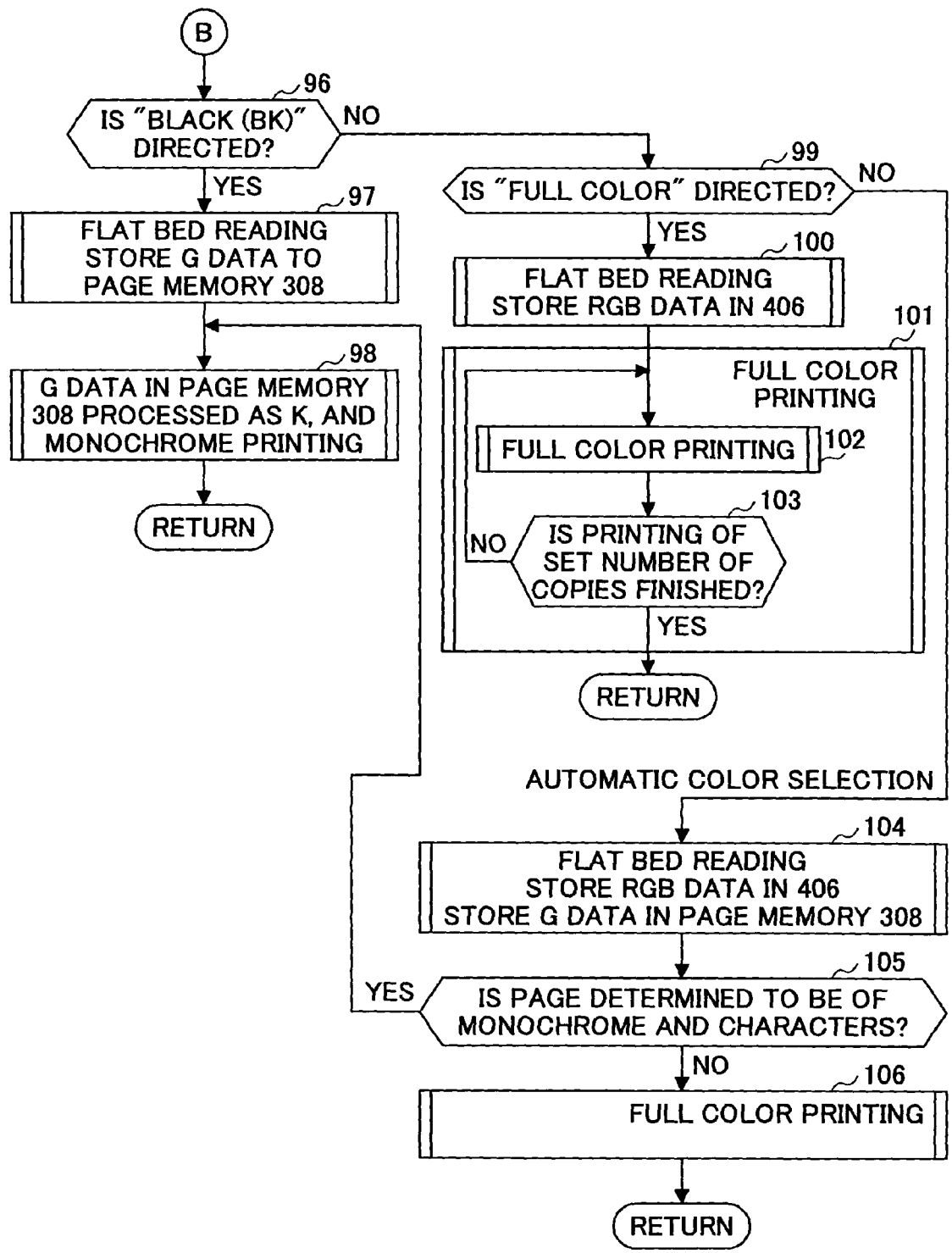
FIG. 17 is a flowchart showing the remainder of the control flow of FIG. 16.

FIG. 16 and FIG. 17 show the outline of copying control of the CPU 301 of the engine 300, which control is performed in response to a copying command. With reference to FIG. 16, if a document is on the ADF 120, the reading unit 110 performs sheet-through document reading. Further, if the button "Black (BK)" is turned on, the CPU 301 causes the scanner image processing unit 303 to store G image data in the page memory 308 (FIG. 7) (81-83), the G image data having been filtered by the filter 307 according to the image area separation result. After performing the sheet-through reading of the document, the CPU 301 reads the G image data from the page memory 308; the printer image processing unit 304 performs a predetermined process including a binarizing process; the writing unit 212 of the printer 200 receives the processed G image data, and repeats a printing process of Bk printing for a set number of sheets; and the printer 200 discharges the set number of copies (84). Then, the next document on the document tray 121 is similarly processed (85-82). In this way, sheet-through reading of documents on the document tray 121 is carried out, and the set number of sheets is printed (84).

In the case wherein the "full color" button is turned on, RGB image data are stored in the memory 406 (86 and 87), and a process of full color printing (88) is carried out. In the process of full color printing (88), the RGB image data are converted into ymck recording color data by the printer image processing unit 304, and data in the recording colors are provided to the corresponding writing units 212 (FIG. 5) in parallel (89). This is repeated for a set number of copies (90-89). The process of full color printing (88) is performed on each of the documents loaded in the document tray 121.

In the case wherein all the "Black (BK)", "Full color", "Automatic color selection", "Cyan (C)", "Magenta (M)", and "Yellow (Y)" buttons are turned off, or the "Automatic color selection" is turned on, the CPU 301 directs sheet-through reading to the reading unit 110, stores the G image data in the page memory 308, the G image data having been filtered by the filter 307 according to an image area separation result, and stores RGB image data in the memory 406 (92). Then, the determination result of the page determining unit 318 is referred to (93). If the determination result indicates that it is a monochrome character image (monochrome & edge), the steps of "Black (BK) printing" (84, and 85) are performed as described above. If the determination results indicates no monochrome character image, a step of full color printing (94) that is the same as the step of full color printing (88) is performed.

Next, FIG. 17 is referred to. If no document is loaded to the ADF 120 when a copy start direction is issued, and if the "Black (BK)" button is turned on, the CPU 301 directs flat bed reading to the reading unit 110, and steps of monochrome copying are performed (96 through 98). Otherwise, if the "Full color" button is turned on, the CPU 301 directs flat bed reading to the reading unit 110, stores RGB image data in the memory 406 (99 and 100), and performs a step of full color printing (101) for a set number of sheets. At the full color printing step (101), the RGB image data are converted into ymck recording color data by the printer image processing unit 304, and data of each recording color are provided to the corresponding writing units 212 (FIG. 5) in parallel (102). This is repeated the set number of times (103 and 102).

When all the "Black (BK)", "Full color", "Automatic color selection", "Blue (Cyan) (C)", "Red (Magenta) (M)", and "Yellow (Y)" buttons are turned off, or if the "Automatic color selection" button is turned on, the CPU 301 directs flat bed reading to the reading unit 110, stores G image data in the page memory 308, the G image data having been filtered by the filter 307 according to the result of the image area separation that refers to the amount of edge detected by the edge emphasis processing unit 311, and stores the RGB image data in the memory 406 (104). Then, the determination result of the page determining unit 318 is referred to (105). If the determination result indicates a monochrome character image, a step of monochrome copying is performed (98) in the same manner as in the case wherein the "Black (BK)" button is turned on. Otherwise, if the determination result by the page determining unit 318 is not a monochrome character image, full color printing (106) is performed in the same manner as the step of full color printing (101).

Embodiment 2

Figure 18:
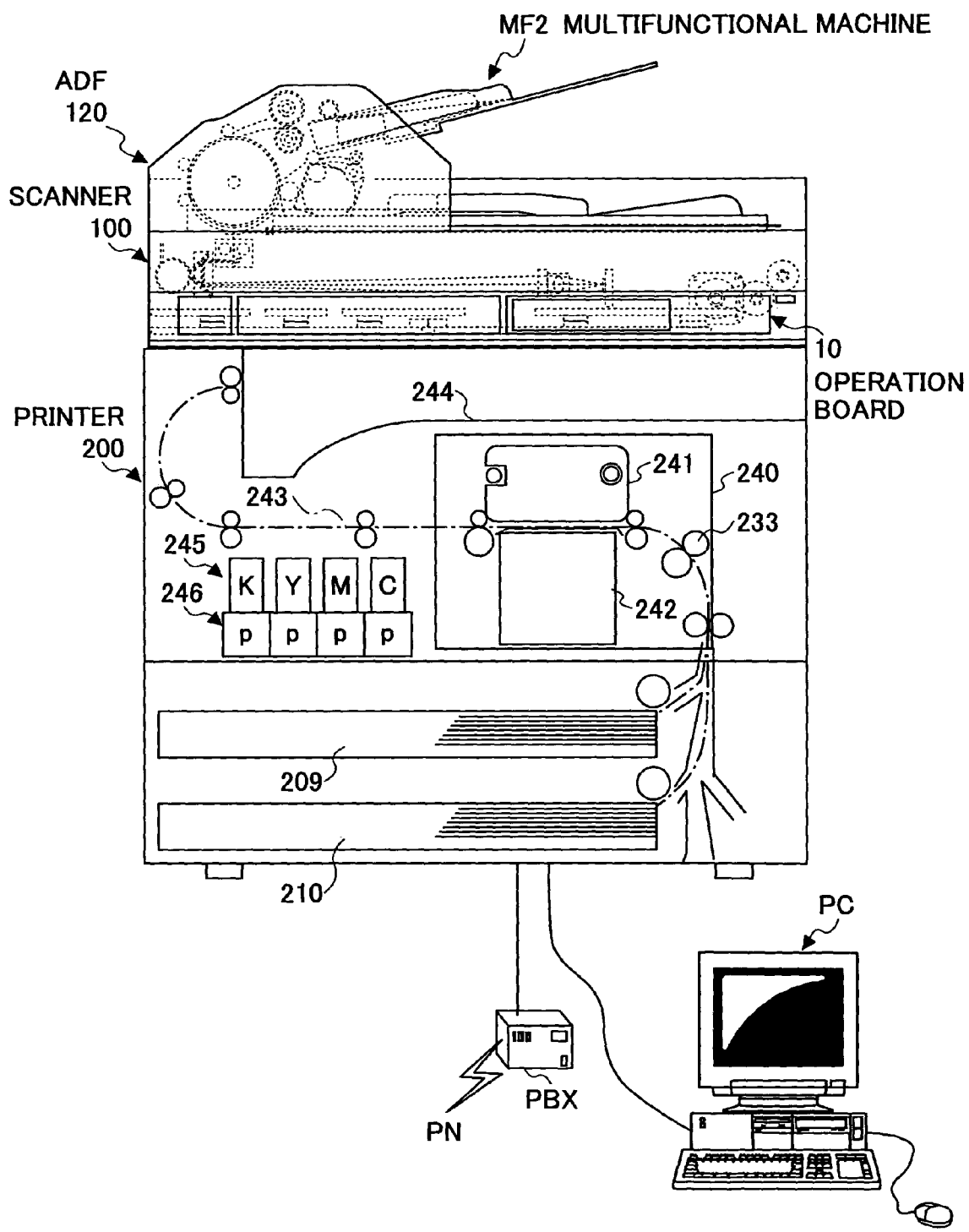
FIG. 18 is a cut-away view of a multifunctional machine MF2 according to Embodiment 2 of the present invention, wherein the outline of the scanner 100 and the ADF 120 is shown; and the printer 200 is shown with a door opened.

Embodiment 2 of the present invention provides a full color digital multifunctional machine MF2 as shown in FIG. 18. The full color copying machine MF2 includes the ADF 120, the operations boards 10, and the scanner 100 that are the same as the full color digital multifunctional machine MF1 of Embodiment 1. However, the full color digital multifunctional machine MF 2 includes a printer 200 that is a full color ink jet printer, which is different from Embodiment 1.

The printer 200 has a printing unit that includes a carriage 241 that moves in directions that go from front to back side, and the reverse, of FIG. 18, which directions are called horizontal scanning directions x. Color ink jet heads are mounted to the carriage 241. C, M, Y, and K ink recording heads are arranged in the horizontal scanning direction x. Each recording head has a high-density array of ink injection nozzles arranged in the vertical scanning direction y (the direction from left to right in FIG. 18). By one scan of the carriage 241 in the horizontal scanning direction x, a part of a color image is formed on a recording medium (form) in a predetermined width in the vertical scanning direction y by each color recording head injecting corresponding color ink. Then, the recording medium is moved in the vertical scanning direction y by a predetermined width, and another scan in the horizontal scanning direction x is performed. By repeating this process, the color image is formed on the recording medium that is provided from one of form cassettes 209 and 210, sent into a resist roller 233, and conveyed along with a form conveyance line 243. The recording medium, on which the color image has been recorded, is sent out to a form delivery tray 244. The C, M, Y, and K inks are provided by ink cartridges 245. The inks are pumped up by corresponding pumps p 246 and are supplied to the corresponding color recording heads.

Immediately after the power is turned on, the carriage 241 (each color recording head) is driven to the position of a recovery tub 242, which position is out of the area of the recording medium in the horizontal scanning directions x, and trial ink injection is performed. Further, trial ink injection is performed when the step of "control of output compensation" (25) shown in FIG. 13 is performed. In this way, the ink injection nozzles are cleaned and clogging thereof is prevented.

Figure 19:
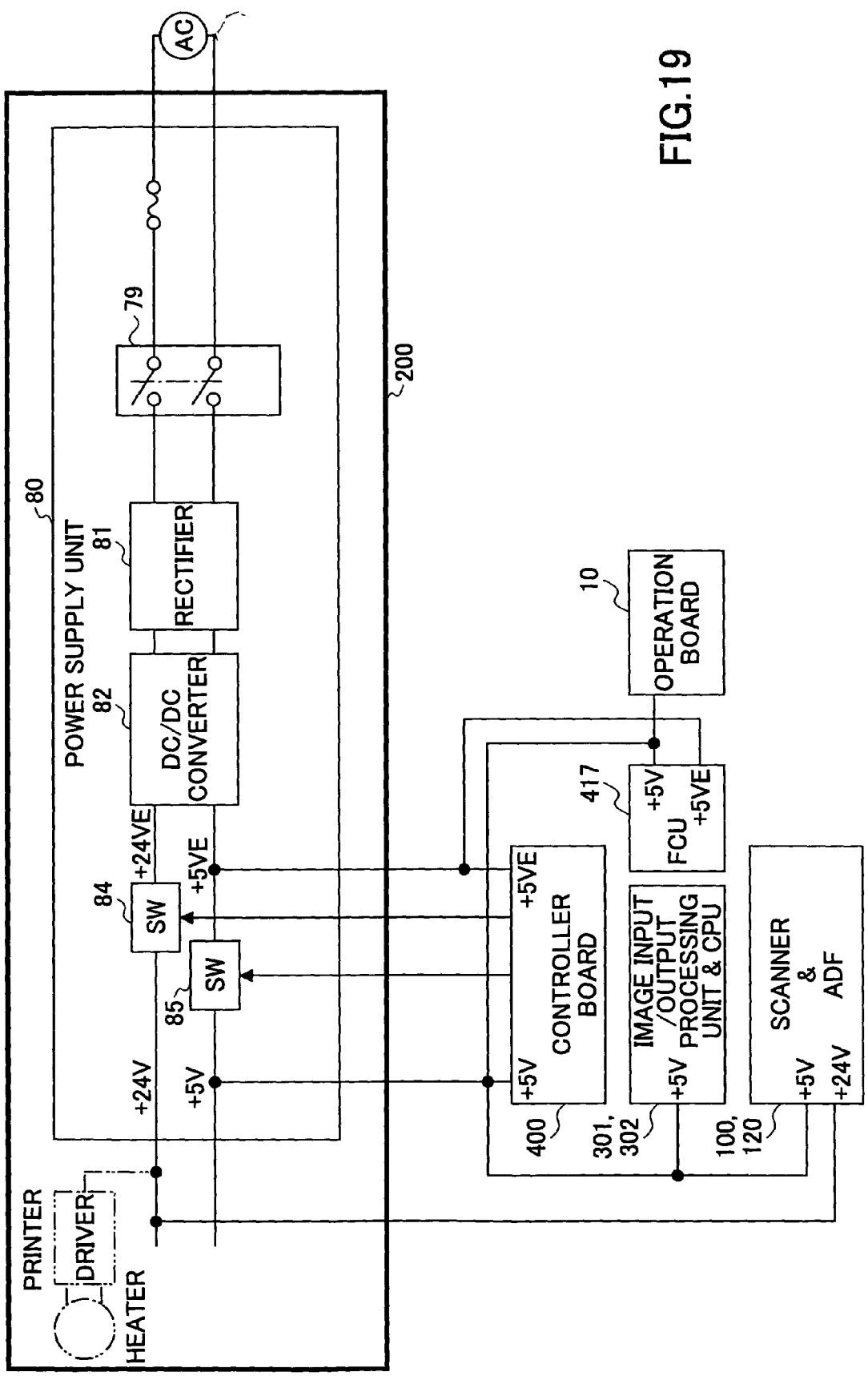
FIG. 19 is a block diagram of the power supply unit 80 of the multifunctional machine MF2.

The configuration of the power supply unit 80 for supplying power to each part of the multifunctional machine MF2 of the Embodiment 2 is shown in FIG. 19. According to Embodiment 2, there is no fixing unit that requires high power. Even when a heater and a blower are provided in order to prompt the ink injected onto the recording medium to dry, high power is not required. Accordingly, the power supply unit 80 of Embodiment 2 does not include the AC circuit 86 and the switch 83 for using the 100 V alternating current power, which are provided in Embodiment 1. Accordingly, the standby mode of the multifunctional machine MF2 corresponds to the low power mode of Embodiment 1. In addition, when providing an air conditioning device such as a heater, a cooler, and a fan to dry the ink or for controlling the temperature inside the multifunctional machine MF2 of Embodiment 2, the air conditioning device is driven by +24 V. Other hardware units of Embodiment 2 are the same as those of Embodiment 1.

Since the energy-saving mode of the power supply unit 80 of Embodiment 2 differs from Embodiment 1, the control of switching between standby mode and pause mode is different, which switching is jointly carried out by the controller board 400 (CPU 402), the operations board 10 (CPU 1), the CPU 301 of the engine 300, the reading unit 110 (CPU), and the AFE 111 (CPU 42) of the Embodiment 2.

That is, since the SW 83 is not provided in Embodiment 2, "standby mode setting up" (2) and (6) shown in FIG. 11 and FIG. 12 for Embodiment 1 cause only the switches SW 84 and SW 85 to be turned on. Further, in Embodiment 2, there is no "Low power mode", or it is the same as "Standby mode" (waiting mode); accordingly, "Low power mode is set up" (16) in FIG. 12 for Embodiment 1 is not applicable to Embodiment 2. Rather, the steps 10 through 12 of setting up the pause mode are performed instead.

Figure 20:
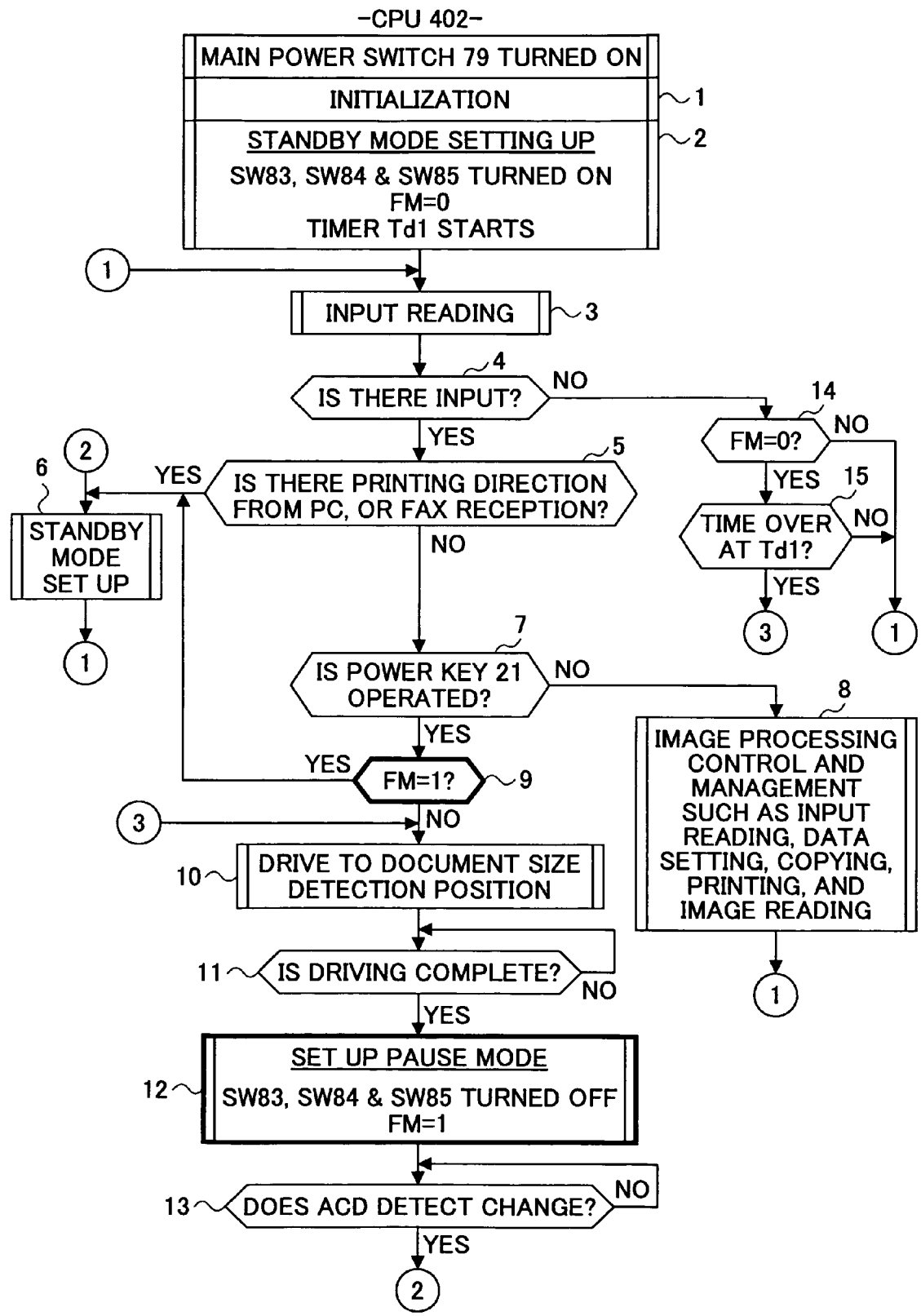
FIG. 20 is a flowchart showing the control flow mainly of energy-saving control performed by CPU 402 of a controller board of the multifunctional machine MF2 shown in FIG. 18.

Consequently, the switching control between standby mode (waiting mode) and pause mode performed by the controller board 400 (CPU 402) of the Embodiment 2 is as shown in FIG. 20. Here, steps that are identified by the same reference numbers as in FIGS. 11 and 12 provide the same functions as described above. The steps of detecting the document size, homing, and image output compensation control (updating) that are jointly carried out by the CPU 301 of the engine 300, the reading unit 110 (CPU), and the AFE 111 (the CPU 42) of the Embodiment 2 of are the same as those of the Embodiment 1 as shown in FIG. 13 and FIG. 14.

Further, the present invention is not limited to these embodiments, but variations and modifications may be made without departing from the scope of the present invention.

The present application is based on Japanese Priority Application No. 2005-052887 filed on Feb. 28, 2005 with the Japanese Patent Office, the entire contents of which are hereby incorporated by reference.

What is claimed is:

1. A document reading apparatus, comprising:
a storage unit configured to store digital conversion parameters and time data associated therewith, said time data representing a time when digital conversion parameters are updated;
a scanner including an image sensor for converting image light reflected from a document into an image signal, an image signal processing unit for converting the image signal into digital image data based on set digital conversion parameters, and a control unit configured to perform a digital conversion parameter setting control for reading the digital conversion parameters in the image signal processing unit;
a power supply unit, operatively connected to the scanner, for providing operating voltages to the scanner in a waiting mode, and for suspending the operating voltages in a pause mode;
an input unit, connected to the scanner, for inputting operation directions to the scanner;
a state change detection unit operatively connected to the scanner and the input unit for detecting a signal change in input signals and for generating a change detection signal representing the signal change;
a clock unit, connected to the storage unit and the input unit, for continuously counting time and for generating the time data; and
an energy-saving control unit operatively connected to the state change control unit, the energy-saving control unit being configured to perform an energy-saving control for switching the power supply unit to the pause mode when there is no operation direction being issued and the waiting mode lasts a predetermined period, and for switching the power supply unit to the waiting mode when the change detection signal is input from the state change detection unit during the pause mode;
wherein in response to outputs of operating voltage by the power supply unit, the control unit of the scanner is configured to determine whether an elapsed time from the last updating time is equal to or greater than a predetermined value based on the time data obtained from the storage unit and an updating time of the digital conversion parameters, and performs a digital conversion parameter correction control when the control unit determines that an elapsed time from the last updating time is equal to or greater than the predetermined value, and
when performing said digital conversion parameter correction control, the control unit of the scanner is further configured to perform correction of the digital conversion parameters and store the digital conversion parameters and the current time associated therewith in the storage unit.

2. The document reading apparatus as claimed in claim 1, wherein
the outputs of operating voltage by the power supply unit include a signal that indicates whether the operating voltage is output by the power supply unit because of external power being provided to the power supply unit, or because of mode switching from the pause mode to the waiting mode, and
the control unit of the scanner performs digital conversion parameter correction control when the outputs of operating voltage by the power supply unit and the change detection signal indicates that the operating voltage is output by the power supply unit because of mode switching from the pause mode to the waiting mode.

3. The document reading apparatus as claimed in claim 1, wherein
the scanner further includes an optical unit and a vertical scanning driving unit for driving the optical unit.

4. The document reading apparatus as claimed in claim 3, wherein
the scanner further includes a reference white plate located between the vertical scanning starting position for reading the document by the optical unit and the document width reading position.

5. The document reading apparatus as claimed in claim 3, wherein
the scanner further includes a document width detection unit for detecting a width of the document based on the image signal when the optical unit is at a document width reading position.

6. The document reading apparatus as claimed in claim 4, wherein
the scanner further includes a translucent plate for receiving a document thereon, a pressurizing member for pressing the document to the translucent plate, and
a descending detecting unit configured to detect a descending movement of the pressurizing member in a direction of the pressurizing member pressing the document, wherein
the document width detection unit detects the document width when the descending movement is detected, and wherein
the scanner further includes an ascending detecting unit configured to detect an ascending movement of the pressurizing member in a direction of the pressurizing member separating from the document, wherein the energy-saving control unit switches the power supply unit to the waiting mode when the ascending detecting unit for detecting the ascending movement in the direction of the pressurizing member separating from the document is detected.

7. The document reading apparatus as claimed in claim 2, wherein
the energy-saving control unit is configured to switch to the pause mode after the optical unit is positioned at the document width reading position when switching the power supply unit from the waiting mode to the pause mode.

8. The document reading apparatus as claimed in claim 5, wherein
the scanner further includes a translucent plate for receiving the document and a descending detecting unit for detecting a descending movement of a pressurizing member for pressing the document onto the translucent plate in a direction of the pressurizing member pressing the document, and
the energy-saving control unit further includes a detecting circuit for detecting switching between open and close states of the pressurizing member in the pause mode, wherein if switching is detected, the power supply unit is put in the waiting mode.

9. The document reading apparatus as claimed in claim 5, wherein
the energy-saving control unit puts the power supply unit in the waiting mode, when the external power is supplied to the power supply unit,
the vertical scanning driving unit drives the optical unit to the vertical scanning starting position for reading the document, and
when the optical unit arrives at a reference point sensor provided at a predetermined position in a direction of vertical scanning, vertical scanning position information of the optical unit is initialized with information representing a position of the reference point sensor in the direction of vertical scanning.

10. The document reading apparatus as claimed in claim 9, wherein
the control unit is further configured to drive the optical unit to a reference white plate reading position, and controls output compensation of the scanner after initialization of the vertical scanning position information.

11. The document reading apparatus as claimed in claim 5, wherein
the vertical scanning driving unit is configured to drive the optical unit to a vertical scanning starting position for document reading after determining the document width by the document width detection unit, and
when the optical unit arrives at a reference point sensor provided at a predetermined position in a direction of vertical scanning, vertical scanning position information of the optical unit is initialized with information representing a position of the reference point sensor in the direction of vertical scanning.

12. The document reading apparatus as claimed in claim 11, wherein
the reference point sensor is located between the vertical scanning starting position for reading the document by the optical unit and the document width reading position.

13. The document reading apparatus as claimed in claim 11, further comprising:
a document conveyance unit for conveying the document in a direction that intersects an imaging scope of the optical unit at a sheet-through reading position in the direction of vertical scanning.

14. The document reading apparatus as claimed in claim 13, further comprising:
a translucent plate for receiving a document, and a detector for detecting an opening state and a closing state of a pressurization member for pressing the document to the translucent plate; and
a document conveying unit that includes
a document tray;
a conveying unit for conveying the document in the document tray in the direction that intersects the imaging scope of the optical unit located at the sheet-through reading position; and
a document sensor for detecting the document in the document tray;
wherein
the vertical scanning unit drives the optical unit to the vertical scanning starting position for reading the document if an elapsed time from a previous operation time is less than a predetermined value, if the translucent plate is closed, and if the document sensor detects the document, and
when the reference point sensor located at the predetermined position in the direction of vertical scanning detects arrival of the optical unit, the vertical scanning position information of the optical unit is initialized by the information that indicates the position of the reference point sensor in the direction of vertical scanning.

15. An image formation apparatus, comprising:
the document reading apparatus as claimed in claim 1;
a printer for printing an image expressed by image data on a recording medium;
an image data processing unit for converting the image data generated by the document reading apparatus into image data that are used by the printer;
an inputting unit for inputting operation directions to the document reading apparatus for reading the document and to the printer for printing; and
a controlling unit for controlling execution of document reading and printing in response to the operation directions that are input.

16. The image formation apparatus as claimed in claim 15, wherein
the printer is configured to perform an electrostatic latent image development method of printing, wherein a toner image imprinted by a photo conductor on a recording medium is fixed by a fixing unit; and
the power supply unit operates in a standby mode wherein power is provided to all loads, including the fixing unit of the image formation apparatus, in a low power mode wherein power is provided to all the loads except the fixing unit; and
in a pause mode wherein power is provided only to a unit for detecting a user operation of the image formation apparatus such that the mode can be shifted to the standby mode; wherein the standby mode and the low power mode constitute the waiting mode.

17. The image formation apparatus as claimed in claim 16, further comprising:
a setting unit for setting a waiting time Td1 that is a time to wait for shifting to the low power mode from the standby mode, and a waiting time Td2 that is a time to wait for shifting to the pause mode from the low power mode, the waiting times Td1 and Td2 being stored in a memory; wherein
the energy-saving control unit is configured to switch the power supply unit from the standby mode to the low power mode when there is no user operation for the waiting time Td1, and switches the power supply unit to the pause mode from the low power mode if there is no user operation in the low power mode for the waiting time Td2.

18. The image formation apparatus as claimed in claim 15, wherein
the printer is an ink jet printer that forms an image by injecting ink onto a recording medium, and
the power supply unit is configured to operate in a standby mode wherein power is provided to all the loads of the image formation apparatus, and in a pause mode wherein power is provided only to a unit for detecting a user operation of the image formation apparatus for shifting to the standby mode, wherein the standby mode is the waiting mode.

19. The image formation apparatus as claimed in claim 18, further comprising:
a setting unit for setting a waiting time Td1 that is a time to wait for shifting to the pause mode from the standby mode, and for storing the waiting time Td1 in a memory; wherein
the energy-saving control unit is configured to switch the power supply unit from the standby mode to the pause mode if there is no user operation of the image formation apparatus for the waiting time Td1.

20. The document reading apparatus as claimed in claim 1, wherein the scanner further includes a reference white plate, wherein
the correction of the digital conversion parameters performed in the digital conversion parameter correction control is implemented by projecting the reflected light from the reference white plate onto the image sensor and correcting the digital conversion parameters including image signal amplification gain for the image signal processing unit such that the image data converted by the image signal processing unit are adjusted to a proper value.

* * * * *